US012210559B1

(12) United States Patent
Moamen et al.

(10) Patent No.: US 12,210,559 B1
(45) Date of Patent: Jan. 28, 2025

(54) MODEL FRAMEWORK FOR MEDIA CONTENT RECOMMENDATIONS

(71) Applicant: Block, Inc., Oakland, CA (US)

(72) Inventors: Loay Moamen, Oakland, CA (US); Thomas Almenningen, Oakland, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/382,111

(22) Filed: Oct. 20, 2023

(51) Int. Cl.
*G06F 16/435* (2019.01)
*G06F 16/438* (2019.01)

(52) U.S. Cl.
CPC ........ *G06F 16/4387* (2019.01); *G06F 16/435* (2019.01)

(58) Field of Classification Search
CPC ............................ G06F 16/4387; G06F 16/435
See application file for complete search history.

(56) References Cited

U.S. PATENT DOCUMENTS

| | | | | |
|---|---|---|---|---|
| 8,666,950 B2* | 3/2014 | Wohlert | ................ | G06F 16/435 707/694 |
| 10,338,882 B2* | 7/2019 | VanBlon | ................. | G06F 3/165 |
| 11,163,843 B1* | 11/2021 | Li | ......................... | G06F 16/906 |
| 11,651,525 B2* | 5/2023 | Moore | ................. | G06V 40/172 345/625 |
| 11,775,581 B1* | 10/2023 | Cao | ......................... | G06F 40/30 707/776 |
| 11,972,170 B1* | 4/2024 | McGilliard | ............ | G06F 3/167 |
| 2006/0254409 A1* | 11/2006 | Withop | ............... | G06F 16/4387 84/601 |
| 2008/0065741 A1* | 3/2008 | Stratton | ................ | H04L 65/612 709/217 |
| 2008/0250067 A1* | 10/2008 | Svendsen | ............ | G06F 16/4387 |
| 2009/0055377 A1* | 2/2009 | Hedge | ................... | G06F 16/435 707/999.005 |
| 2009/0307296 A1* | 12/2009 | Gibbs | ................... | G06F 16/435 708/607 |
| 2015/0281383 A1* | 10/2015 | Bilinski | .................. | H04L 67/53 709/202 |
| 2017/0357479 A1* | 12/2017 | Shenoy | ................... | G06F 3/165 |
| 2018/0107670 A1* | 4/2018 | Jaini | ...................... | G06F 16/532 |
| 2018/0157759 A1* | 6/2018 | Zheng | ................. | G06F 16/9038 |
| 2018/0349492 A1* | 12/2018 | Levy | ...................... | G06F 16/639 |
| 2019/0294690 A1* | 9/2019 | Pastor | .................... | G06F 16/435 |
| 2022/0303626 A1* | 9/2022 | Srinivasaraghavan | ...................... | H04N 21/6582 |
| 2022/0303632 A1* | 9/2022 | El Ghazzal | .......... | H04N 21/466 |
| 2022/0337898 A1* | 10/2022 | Dorogusker | ............ | H04L 51/52 |

(Continued)

*Primary Examiner* — Jorge A Casanova
(74) *Attorney, Agent, or Firm* — IP Spring

(57) ABSTRACT

Technologies are described herein for media content recommendations. For example, a method of media content recommendations may include generating, by a plurality of machine learning algorithms, a first set of media content recommendations, a second set of media content recommendations, and a third set of media content recommendations. The method may also include generating a first playlist based on the first set of media content recommendations and the second set of media content recommendations, generating a second playlist based on the second set of media content recommendations and the third set of media content recommendations, and providing the first playlist and the second playlist to at least one of the one or more media applications.

20 Claims, 10 Drawing Sheets

(56) References Cited

U.S. PATENT DOCUMENTS

| | | | |
|---|---|---|---|
| 2022/0417579 A1* | 12/2022 | Dorogusker | G06Q 50/01 |
| 2023/0028389 A1* | 1/2023 | Gillipalli | H04N 21/454 |
| 2023/0092783 A1* | 3/2023 | Master Ben-Dor | H04L 67/306 |
| | | | 706/12 |
| 2023/0169113 A1* | 6/2023 | Pham | G06F 16/635 |
| | | | 700/94 |
| 2024/0053951 A1* | 2/2024 | Moro | G06F 3/0482 |
| 2024/0086480 A1* | 3/2024 | Perelli-Minetti | G06F 16/9536 |

* cited by examiner

MODEL FRAMEWORK FOR MEDIA CONTENT RECOMMENDATIONS

TECHNICAL FIELD

Music listeners wishing to stream songs for listening typically initialize a music streaming application and select songs or a playlist to playback. A music streaming application can create playlists based upon user selections or user playback history of particular songs played through the streaming application. Generally, these playlists are created on a per-user basis. The description provided herein is for the purpose of presenting the context of the disclosure. Content of this section, as well as aspects of the description that may not otherwise qualify as prior art at the time of filing, are neither expressly nor impliedly admitted as prior art against the present disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
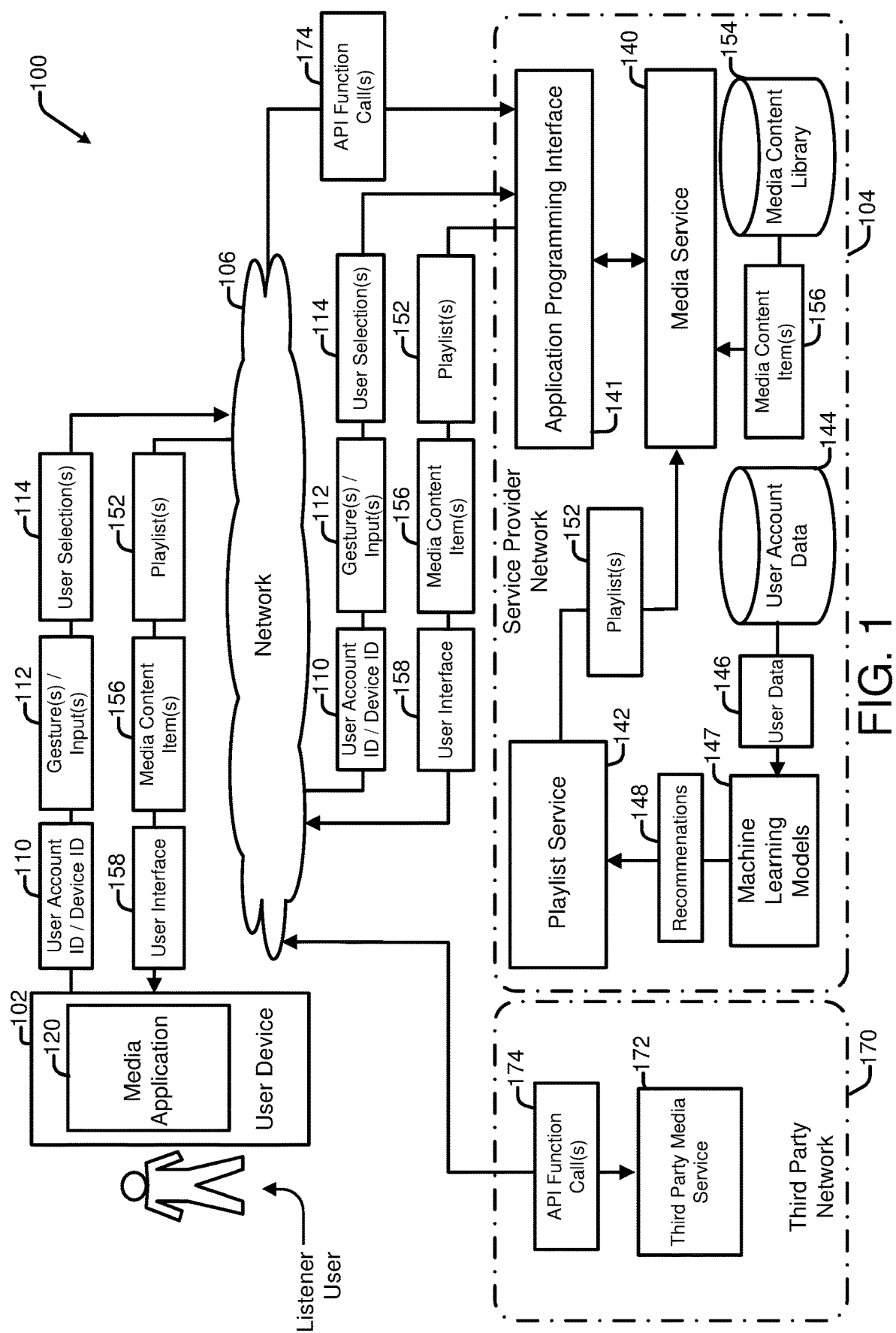
FIG. 1 is a diagram showing aspects of an illustrative operating environment and several logical components provided by the technologies described herein.

The following detailed description is directed to technologies for media content recommendations. Some users may request or receive media content recommendations from media service providers, such as through a service provider network. The service provider network may include a media application, a media website, a media server, and/or other media service components and services. Different types of users may receive media content recommendations from different sources. For example, listener users may be users who use media applications for playback of media content items on a user device, such as songs, videos, music, sound effects, or other media content items. Listener users may also use media websites through a web browser, or other website access techniques, to playback media content items. Other users may also use media applications, media websites, and others to otherwise access media content items. The media applications, media websites, and/or other media services may provide media content items to a user device, for playback at the user device, such as by streaming or transmitting a computer-executable file to the user device.

Conventional media services, such as conventional media applications, typically provide users with selectable options for media content playback. For example, the options may include options to select a playlist, track, artist, or other options to begin media playback. The playlists may be user-specific and based upon consumption history for a user that is accessible by the media application. However, some conventional media applications may have limited playback history for a user, limited access to automated resources for playlist generation, and may lack other features that improve playlists.

For example, some conventional media applications require a user to type in data, select preferences, select a media content item or multiple items, generate a playlist through manual selection, and/or input other data prior to beginning playback of content. In these example scenarios, users may iterate through several different steps prior to playback of recommended media content items commencing. Furthermore, the limited user history available on some media applications may require even more selections such that a base level of user consumption preferences are ascertained prior to being capable of automatically generating a playlist.

For instance, a user of a conventional media application with limited playback history accessible thereon, may have to provide a plurality of musical preferences, artists, genres, and others, prior to a basic playlist being generated. Additionally, utilizing the limited playback history and user-provided preferences may only provide a limited set of data points by which to generate a playlist. Therefore, in these scenarios, a first generated playlist may be very similar to a second generated playlist. Accordingly, a user must utilize the media application for several time periods of listening prior to additional musical preferences for the user being ascertained through playback history, such that more robust media content recommendations can be made.

However, as described herein, media content recommendations using techniques explained herein significantly reduce the number of steps, network transmissions, and computational resources to effectively provide automatic playlist generation. Additionally, media content recommendations as described herein may overcome drawbacks associated with repetitive content in multiple playlists. Furthermore, media content recommendations as described herein may provide benefits related to computational efficiency and storage resource allocation through intelligent caching of media content recommendations. Moreover, media content recommendations as described herein may provide externally accessible automatically generated playlists based on media content recommendations provided by a plurality of machine learning models, for example, through exposure of an application programming interface (API) that allows retrieval of automatically generated media content recommendations and/or playlists.

For example, in an implementation, an API may be exposed at a service provider network. The service provider network may store user profile data, media consumption history, user preferences, genre consumption history, song consumption history, playlist engagement history, and others, for a plurality of users. A plurality of different machine learning models trained to automatically generate media content recommendations based upon one or more of the stored data may be deployed at the service provider network. The API may include function calls that allow retrieval of at least a portion of the output of the plurality of trained machine learning models such that media content recommendations and/or playlists may be requested by a third party media application.

The described API and function calls may allow the retrieval of playlist data and/or media content recommendations while retaining user privacy and anonymizing sensitive data prior to transmitting a reply to the third party media application. In this manner, the API is a logical layer exposed external to the service provider network, which allows functions of the service provider network to be accessible by third party media applications. Therefore, using the API, the third party media application may present automatically generated playlists that overcome drawbacks associated with automatic generation of recommendations with too few or too sparse data points while ensuring privacy of user data and preferences on which the recommendations are based.

The plurality of trained machine learning models may be arranged to receive one or more different types of consumption history, profile data, device data, user data, engagement data, and others, such that media content recommendations do not significantly overlap between outputs of different machine learning models. For example, a first model may generate recommendations based on a first and second type of data, a second model may generate recommendations based on the second and a third type of data, and so on, so that different combinations of data are input into different models. Furthermore, different types of models may be deployed that generate media content item recommendations based upon different algorithms. In this manner, different models may generate different recommendations that do not overlap, as well.

A software service (such as a playlist generation service) may select portions of the outputs from the machine learning models to create one or more playlists. The one or more playlists may be distributed directly to a user device or to the requesting third party media service. In this manner, the generated playlists that are distributed may be based upon user data and may lack significant overlap therebetween (i.e., based upon different input data, different model structure, and/or a combination thereof).

User inputs during playback may be stored as engagement data to inform future recommendations based upon: length of playback of a particular playlist, length of playback of a particular media content item, repetitive plays of a particular media content item, continued engagement with a particular playlist, continued engagement with a particular genre, and others. The engagement data may be used for future automatic playlist generation based on the user accessing the same third party media application, for example, such that subsequent playlist requests from the same third party application results in the new engagement data providing more robust recommendations. The engagement data may also be stored as general data to inform automatic generation of playlists for the same user across different third party media services. In this manner, a user's engagement history may be taken into consideration across many different providers, allowing for a robust and engaging user experience with third party services that leverage the exposed API and associated media content recommendations. Sharing a user's engagement history across multiple providers reduces computational resources compared to conventional systems where engagement monitoring and content recommendation are duplicated across the multiple providers.

Furthermore, as the techniques described herein rely on requests made to the exposed API at a service provider network, prior media content recommendations may be stored for fast retrieval and limited recalculation (e.g., caching of content to be played if a user were to switch playlists, request new playlists, switch media applications, etc.). Therefore, the techniques described herein may reduce storage requirements at a third party media application, may reduce computational load from repeatedly generating playlists based on the same media content recommendations, may reduce computational load from executing requests to repeatedly generate media content recommendations based on the same or similar input data, may reduce network bandwidth by limiting a number of times user data must be transmitted, and may improve efficiency by reducing repetitive computation of additional recommendations for playlist generation.

In the following detailed description, references are made to the accompanying drawings that form a part hereof, and which are shown by way of illustration as specific implementations or examples. Referring now to the drawings, aspects of computing systems and methodologies for automatic generation of timing-based media content will be described in detail.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 illustrates an operating environment and several logical components provided by the technologies described herein. In particular, FIG. 1 is a diagram showing a system 100, according to one implementation.

System 100 is provided for illustration. In some implementations, the system 100 may include the same, fewer, more, or different elements configured in the same or different manner as that shown in FIG. 1.

The system 100 may include a user device 102, a service provider network 104, and a third-party network 170, which are connected via a network 106. Differing numbers of users and user devices may be operatively connected to the network 106 and/or in operation with the system 100.

The user device 102 may include any suitable computing device, for example a personal computer (PC), mobile device (e.g., laptop, mobile phone, smart phone, table computer, netbook computer, etc.), network-connected television, audio/video componentry with Internet access, network-connected cable set-top box, network-connected audio/video device (e.g., HDMI-interfaced smart component configured to display video and provide audio to a television or monitor), automobile head-unit with network-access (e.g., car stereo or car console device), or other suitable device.

The user device 102 may be associated with a user. The user may listen to media content items, watch and listen to videos, and otherwise stream media content items onto the user device 102. The user may also request playlists for storage on the user device 102 and/or streaming, select user preferences for automatic features described herein, and others, with the user device 102.

The user device 102 may include one or more instances of a media application 120 configured to execute thereon. In some implementations, the media application 120 includes computer-executable code configured to implement the technologies as described herein. The media application 120 may be configured to provide one or more user interfaces, receive user interaction data and/or user selections, and/or provide media content items and playlists for enjoyment by a user.

For example, in some implementations, the media application 120 is configured to present a user interface 158. The user interface 158 may be configured to present a user with options to request a media content item or items 156, a playlist or playlists 152, and initiate playback of media content item 156 based upon user account data or other data. In some implementations, a user account identifier (ID) 110 may be transmitted to the service provider network 104 over the network 106. In some implementations, the user account ID 110 may be received by the service provider network 104 directly from the user device 102.

Responsive to receipt of the user account ID 110, user interface 158, media content item(s) 156, and playlists(s) 152 may be transmitted to the user device 102 over the network 106. In some implementations, the user interface 158, media content item(s) 156, and playlists(s) 152 may be received by the user device 102 directly from the service provider network 104.

In some implementations the user interface 158, media content item(s) 156, and playlists(s) 152 may be received by the user device 102 via network 106 and from a third-party network 170.

In some implementations, network 106 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

The service provider network 104 may be a platform including one or more servers having one or more computing devices (e.g., a cloud computing system, cluster of physical servers, etc.). The service provider network 104 may be configured as a software-as-a-service (SaaS) platform, a media content platform, a social networking platform, and/or as another computing platform configured to provide engaging experiences for users and content creators. In some implementations, the service provider network 104 monetizes media content or other content and provides monetary revenue to creators of the monetized content.

The service provider network 104 may include instances of a media service 140 and a playlist service 142.

In some implementations, the playlist service 142 may comprise or be in operative communication with one or more machine learning models 147 configured to receive as input user data 146 that is retrieved from a user account data store 144. The user data 146 may be associated with user account ID 110. In examples, the user data 146 may include a consumption (e.g., listening, watching, reading, etc.) history associated with the user account ID 110, such as which media content items the user account ID has consumed, media content items that the user account ID skipped or replayed, context associated with consumption (e.g., time of day, time of year, activity being performed, device connections such as speakers or headphones, etc.), and the like. The machine learning models 147 may use the user data 146 to generate media content recommendations 148. In some cases, such as where user data 146 is unavailable for a particular user account ID, the machine learning models 147 may receive as input other information provided by the user (such as preferred genres, preferred artists, preferred media content items, demographic information, and the like), other playback history, device identifiers and history, and/or others, as inputs to determine media content recommendations 148.

The playlist service 142 may receive the media content recommendations from the machine learning models 147, and may generate one or more playlists 152 based upon the media content recommendations 148.

For example, and without limitation, the playlist service 142 and machine learning models 147 may be deployed as a recommender system inputting user data 146 and generating the media content recommendations 148 and playlists 152 based on training to ascertain user preference through both implicit and explicit feedback. In some implementations the recommender system is re-trained periodically, re-trained based on deviation from ground truths, or otherwise re-trained to provide improved recommendations. Furthermore, playlist service 142 and machine learning models 147 may include other forms and structure of models in some example implementations. Output from any of the associated models may drive determination of media content recommendations 148 for generation of playlists 152 for a user account by the playlist service 142 or another service.

In some implementations, the playlist service 142 may operate to determine playlists based upon a context of a user associated with a user account. The context may be categorized based upon different factors such as intent of a listening session (e.g., active listening or passive listening), mood or feelings of a current user or users, activity indication of the user device (e.g., GPS motion, step data, accelerometer data, etc.) and other factors.

In some implementations, the playlist service 142 may also operate to determine playlists based on various types of recommendations. For instance, types of recommendations may include explicit recommendations, implicit recommendations, and exploratory recommendations.

Explicit recommendations may be based on what a user listened to in a last session (e.g., high probability that the user wants the same experience, high probability that the user wants a different experience, etc.) and/or what a user has searched or added to a personal or account collection of media content items, to name a few examples.

Implicit recommendations may be based, for example, on new content from artists the user has previously listened to, older content from artists the user has previously listened to, content associated with other users having similar listening habits (e.g., through clustering or other similarity measures), and/or recently added content in online playlists the user may have accessed.

Exploratory recommendations may be based on different factors, such as viral content, editorial recommendations, popular content, unknown content (e.g., to gauge interest in a genre, artist, or other content that the user has not yet listened to), or other similar factors.

The playlist service 142 and machine learning models 147 may also operate to provide recommendations based on device type, user type (e.g., paying or non-paying), location data (e.g., work, home, gym, GPS-based locations, etc.), direct feedback during listening, and other explicit/implicit features that may be ascertained by the playlist service 142 through polling of data from the user device 102, or accessing data associated with the user device 102 or user account ID 110.

The media content recommendations 148 may include a list of media content items that are determined to be of interest to one or more users associated with the user account ID 110. The media content recommendations 148 may be provided to the playlist service 142. The playlist service 142 may generate the playlists 152 based upon the media content recommendations 148 and other aspects noted above. The playlist service 142 may transmit the playlists 152 to the media service 140.

The media service 140 may include computer executable code configured to implement one or more of the technologies and/or techniques described herein. In one implementation, the media service 140 is a back-end software service executing on one or more servers of the service provider network 104. In this example, the media service 140 provides back-end service to the media application 120, which serves as a front-end.

In one implementation, the media service 140 is a functional back-end and front-end providing access to media services of the service provider network as software-as-a-service (SaaS) platform. In this example, the media service 140 may be accessible to the user device 102 through a website, a mobile application, a desktop application, or other suitable program.

In one implementation, the media service 140 provides the functionality of the media application 120, as well as back-end functionality as described herein. In this example, the media application 120 may be used interchangeably with the media service 140.

For example, the media service 140 may receive, as input, the playlists 152. The playlists may include a plurality of media content items 156 that are able to be retrieved from media content library 154. In some examples, a playlist may correspond to an album by a particular artist or artists, a list of media content items curated by the media service 140 (e.g., by a content curator, by artificial intelligence such as generative artificial intelligence, etc.), a list of content items curated by the user or a listener user or artist user, and so forth.

In some implementations, the media content library 154 may be stored in a non-transitory computer readable memory (e.g., random access memory), a cache, a drive (e.g., a hard drive), a flash drive, a database system, or another type of component or device capable of storing data. The media content library 154 may also include multiple storage components (e.g., multiple drives or multiple databases) that may also span multiple computing devices (e.g., across multiple server computers, in a distributed storage system, etc.).

The media service 140 may be configured to provide the media content item(s) 156, the playlists 152, and the user interface 158 to the user device 102. Additionally, the media service 140 may be configured to communicate with a third-party network 170 via an application programing interface (API) 141.

The API 141 may be exposed, by the service provider network 104, to the network 106 and operatively connected devices, services, and others. The API 141 may include a plurality of function calls associated therewith that provide the ability for an external service (e.g., such as the third-party network 170) to transmit function calls such that the functionality related to playlist generation and media content recommendations are accessible by the third-party network 170.

The API 141 may include functions related to generating playlists, generating media content recommendations, generating long-format playlists (e.g., such as streaming channels for continuous playback), providing anonymized user preference data, providing anonymized playback history, and others. Using the API 141, external services and networks may securely request playlists such that unavailability of user data on those external services does not impact user enjoyment of playlists, require repetitive user input of preferences, or otherwise provide detrimental or poorly curated playlists.

The third-party network 170 may be any suitable third-party network having a third-party media service 172 executing thereon. In some implementations, the third-party media service 172 may operate similar to the media service 140. In some implementations, the third-party media service 172 may have limited user data, limited user playback history, limited user preferences, limited functionality, and/or limited services.

The third-party media service 172 may access the exposed API 141 through API function calls 174 transmitted over network 106. The API function calls 174 may include instructions or requests to generate media content recommendations 148 and generate playlists 152 as described above.

In response to receipt of one or more API function calls 174, the API 141 may direct the media service 140 to request playlists 152 from the playlist service 142. The media service 140 may transmit the requested playlists 152 to the user device 102 for the third-party media service 172, in some implementations.

In some implementations, the requested playlists 152 may be provided to the third-party media service 172, which redirects the playlists to the user device 102.

In some implementations, the requested playlists 152 may be transmitted to both the third-party media service 172 and the user device 102 over the network 106.

As described above, the system 100 provides media content recommendations and playlists that may be accessible by a third-party network 170 through API function calls 174. Based on a user account ID 110, the machine learning models 147 may provide media content recommendations 148 to the playlist service 142. The playlist service 142 may generate playlists 152 based upon the media content recommendations 148. The playlist service 142 may provide the playlists 152 to the media service 140. The media service 140 may provide a user interface 158, one or more media content items 156, and playlists 152 to the media application 120. The media application 120 may automatically initiate playback of the received media items of the playlist 152. In this manner, the media application 120 may playback media content items that are recommended based upon user data 146, which may be more robust as compared to user data available to the third-party media service 172 individually.

During playback, the user may input a gesture or other input 112 (e.g., such as a single gesture input, swipe, multiple-gesture input, input selection, multiple selection, and others) to change media content items for playback. Based on the input 112, the media service 140 may select a new media item 156 or playlists 152, and provide the new media item 156 or playlist 152 for playback and display, respectively, at the user device 102. Other inputs 112 provided by the user during playback may cause other changes to playback, including changes to a current playlist, changes to location within a playlist, changes to a type of listening (e.g., continuous radio, streaming, or others), and others. In this manner, the media application 120 is navigable by a user through different inputs, such that a user may switch playlists, as well as skip and restart/replay a previous song in a current playlist, select new songs, select different genres, and/or otherwise manipulate playback at the user device 102. Other variations of these operations may also be applicable.

For example, in some implementations, the third-party media service 172 may provide some or all of the functionality of the media application 140 through use of API function calls 174.

For example, in some implementations, the media application 120 may provide some or all of the functionality of the media service 140.

As described above, a recommender system comprising the playlist service 142 and machine learning models 147 may curate playlists based upon user data 146 identified through user account ID or device ID 110. For example, the machine learning models 147 may include a plurality of machine learning models arranged to provide different media content recommendations as outputs. In some implementations, the plurality of machine learning models' outputs may be leveraged in different combinations to provide different or differing media content recommendations based on an underlying training of the machine learning model and its structure.

Figure 2:
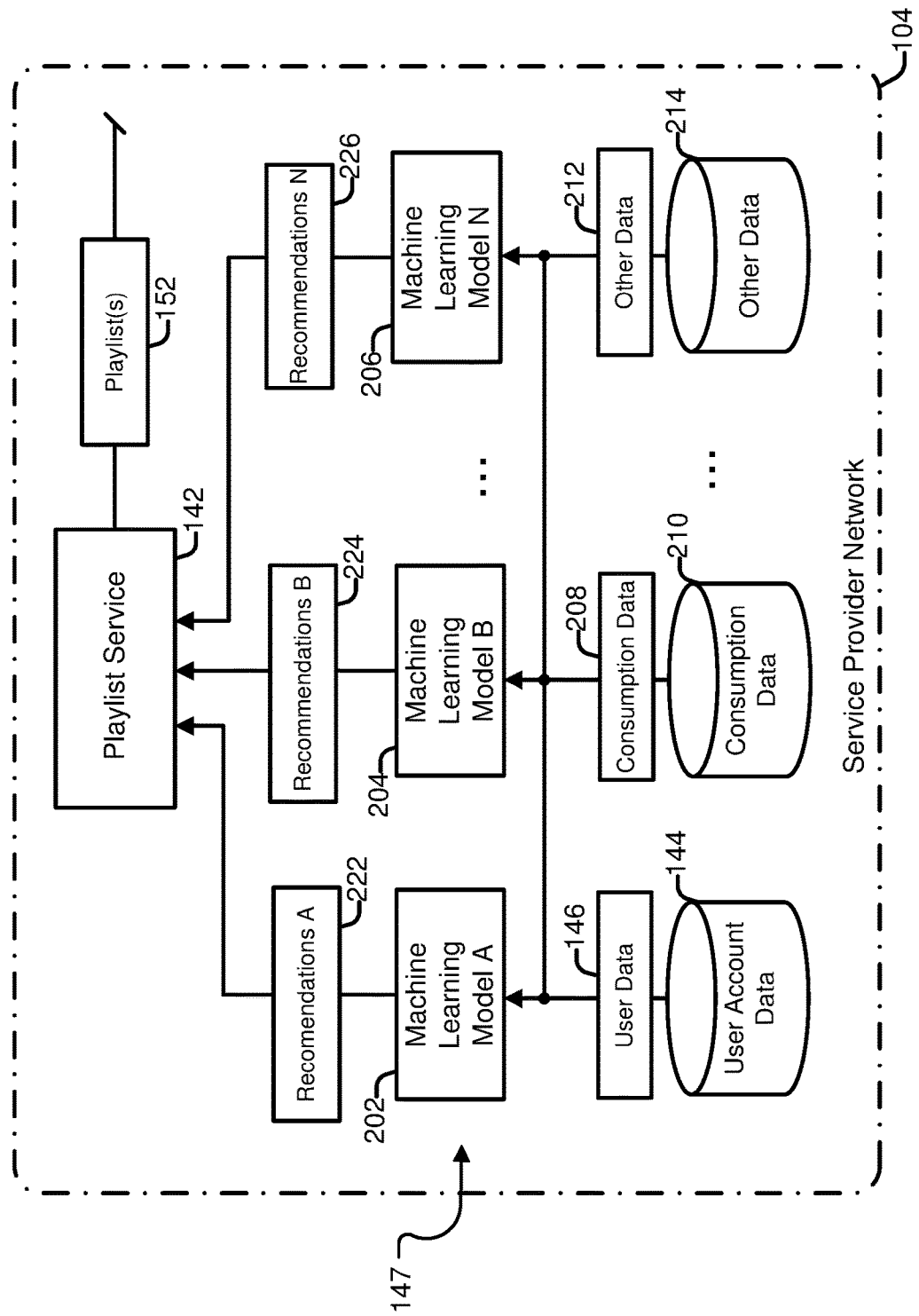
FIG. 2 is a diagram showing aspects of multiple machine learning models arranged to provide media content recommendations, according to an implementation presented herein.

FIG. 2 is a diagram showing aspects of multiple machine learning models 147 arranged to provide media content recommendations 148, according to an implementation presented herein. As illustrated, the machine learning models 147 and playlist service 142 are arranged in the service provider network 104 for providing playlists 152 to different services, devices, and/or networks through use of an exposed API.

In some implementations, the machine learning models 147 may include at least three machine learning models or algorithms. For example, a first machine learning model A 202, a second machine learning model B 204, and a third machine learning model N 206 may be arranged to receive user data 146, consumption data 208, and/or other data 212, as input.

In some implementations, the user data is retrieved from a user account data store 144. In some implementations, the consumption data is retrieved from a consumption data store 210. In some implementations, the other data 212 is retrieved from other data store 214.

Each of the data stores 144, 210, and 214 may be arranged similarly, or differently, and may be deployed at the service provider network 104. In some implementations, the data stores 144, 210, and 214 may be stored in a non-transitory computer readable memory (e.g., random access memory), a cache, a drive (e.g., a hard drive), a flash drive, a database system, or another type of component or device capable of storing data. The data stores 144, 210, and 214 may also include multiple storage components (e.g., multiple drives or multiple databases) that may also span multiple computing devices (e.g., across multiple server computers, in a distributed storage system, etc.).

In some implementations, the user data 146 may include user playback history, user preferences, user demographics, user account status, user playtime amounts, user engagement metrics, and others.

In some implementations, the consumption data 208 may include consumption data associated with one user, many users, a group of users, a group of listeners to a particular genre, a group of listeners to a particular artist, a group of listeners to a particular label, and/or combinations thereof. For example, some consumption data may be associated with a particular user, while other consumption data may be associated with groups of listeners, cohorts of listeners, clusters of listeners, and so on. Other variations are also applicable.

In some implementations, the other data 212 may include other forms of history, preferences, and/or selections, such as social media history, comments or "likes" associated with particular artists, genres, labels, and other suitable data. The other data 212 may be based on particular users, groups of users, clusters of users, and so on.

The machine learning models 147 may take in some, all, sub-combinations, or sub-portions of the input data 146, 208, and/or 212, and generate as output sets of recommendations A 222, recommendations B 224, and recommendations N 226.

The playlist service 142 may take as input one or more of the sets of recommendations A, 222, recommendations B, 224, and recommendations N 226, and create one or more playlists 152 as output.

In some implementations, some of all of the functionality of the playlist service 142 may be performed by a trained machine learning model. For example, in some implementations, a machine learning model may be trained to choose selections from the one or more sets of recommendations A, 222, recommendations B, 224, and recommendations N 226. The machine learning model can also be trained to output one or more playlists 152, in some implementations.

In some implementations a trained machine learning model may also be deployed to choose selections from the one or more sets of recommendations A, 222, recommendations B, 224, and recommendations N 226. The output selections, in this example, may be received as input to the playlist service 142. The playlist service 142 may use the received selections to generate or create one or more playlists 152 as output. Other variations in choosing selections and playlist generation may also be applicable.

In some implementations, the machine learning models 147 are each a different type of model. For example, the machine learning models 147 may include, but are not limited to, collaborative filtering models, two-tower models, and sequence models. The machine learning models 147 may also include other types of machine learning models and algorithms, trained to generate media content recommendations based upon input user data, consumption data, and other data.

In some implementations, the machine learning models 147 are each a different type of model and receive different input data. In some implementations, the machine learning models are each a different type of model and receive the same input data.

In some implementations, the machine learning models are different combinations of similar and different models, such as, for example, two or more of the same type of model with at least one different model. Other variations and combinations of machine learning models may also be applicable.

Once input data (e.g., data 146, 208, and/or 212) are received as input, the machine learning models 147 may generate the respective output recommendations A 22, recommendations B 224, and recommendations N, 226. The playlist service 142, using user profile data or device profile data (e.g., identified with account IDs 110, FIG. 1) may generate playlists 152. The service provider network 104 may transmit the playlists 152 to a requestor (e.g., based on a source of the API calls 174) and/or a device associated with a user account.

Hereinafter, functionality associated with the above-described operating environments of FIGS. 1-2 is described in detail.

Figure 3:
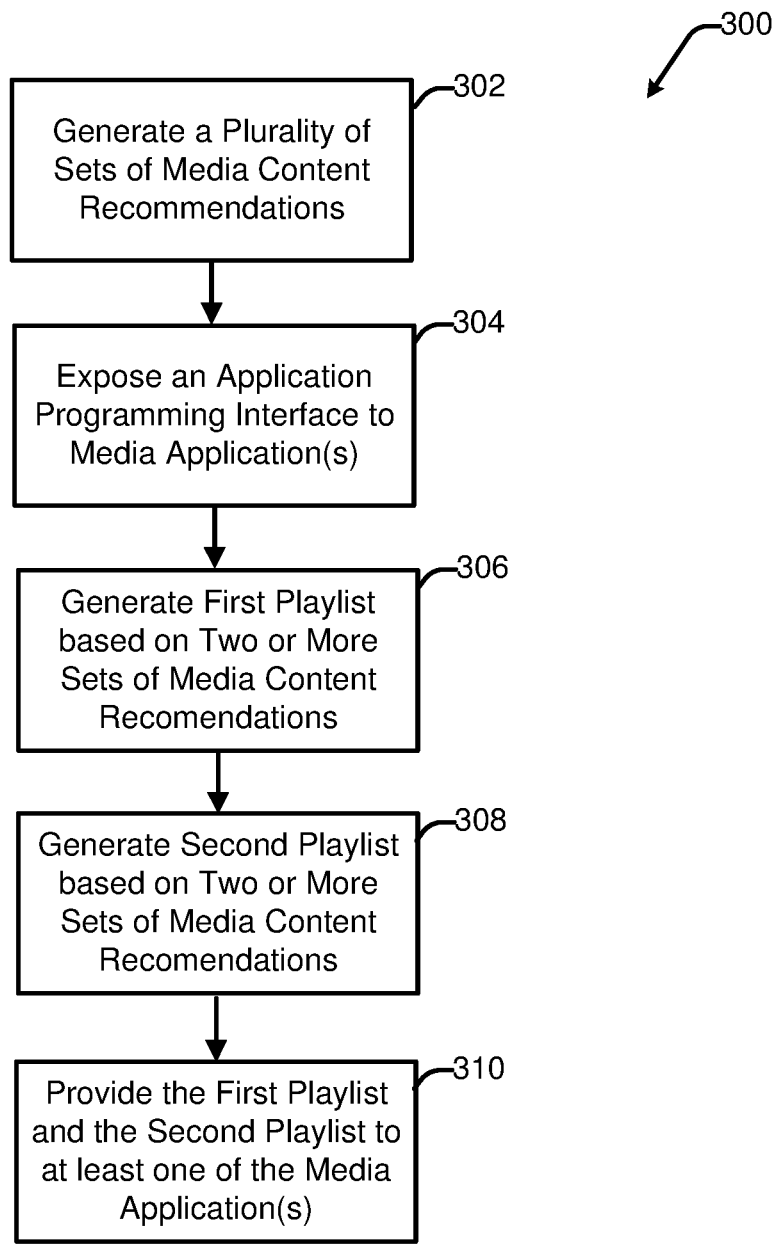
FIG. 3 is a flowchart showing aspects of a method for media content recommendations, according to an implementation presented herein.

FIG. 3 is a flowchart showing aspects of a method 300 for providing media content recommendations, according to an implementation presented herein. Method 300 may be performed during initialization and/or execution of a media application at a user device. The user device may be in communication with a media service over a network, including a third-party media service with access to an exposed API. Method 300 may begin at block 302.

At block 302, a plurality of machine learning algorithms may generate a first set of media content recommendations, a second set of media content recommendations, and a third set of media content recommendations. For example, the generation of the sets of media content recommendations may be based upon user consumption history and/or playback history. Although three sets of media content recommendations are described in relation to the method 300 and elsewhere herein, any suitable number of sets of media content recommendations may be implemented without departing from the scope of the disclosure.

In some implementations, other types of consumption history may be used, for example, consumption by similar or clustered users, consumption by others listening to a particular genre or streaming channel, and others.

In some implementations, input data associated with a user may be anonymized prior to providing an external requestor with portions of data or output data. For example, user profile data may be scrubbed of personal content, scrubbed of identifying details, and/or otherwise anonymized. Therefore, the method may also include anonymizing the content consumption history associated with the user account.

In some implementations, the first set of media content recommendations, the second set of media content recommendations, and the third set of media content recommendations are based on a content consumption history associated with a user account ID and/or a device ID. For example, if user account data is available, the user account ID may be used. However, device consumption history, where the device is or has been associated with a user account, may also be used through the device ID.

Furthermore, according to implementations described herein, the first set of media content recommendations, the second set of media content recommendations, and the third set of media content recommendations may include at least one different media content recommendation from one another. For example, as different input data and/or different machine learning algorithms may be used, the media content recommendations may have reduced overlap and therefore may overcome drawbacks associated with third-party media services having limited or no user consumption history available. Additionally, third-party media services having limited or reduced capacity for trained machine learning models may also leverage API function calls to receive, in response to a request, curated playlists and/or media content recommendations that are associated with a user's preferences and listening history on the service provider network 104.

In some implementations, the machine learning models may be deployed at a server of the service provider network 104.

In some implementations, the machine learning models may at least be partially deployed at a user device.

In some implementations, the machine learning models may be deployed at more than one server associated with the service provider network 104.

Block 302 may be followed by block 304.

At block 304, an application programming interface (API) may be exposed to one or more media applications. The API may be exposed by allowing external access to descriptions of function calls, and instructions on transmission of function calls, to third-party networks and/or external services. Block 304 may be followed by block 306.

At block 306, a first playlist may be generated based on the first set of media content recommendations and the second set of media content recommendations. In some implementations, the generating is via the API and in response to a user input associated with the one or more media applications. For example, a user may input a plurality of different types of requests into a user interface presented on a user computing device. Details associated with the playlist may be presented on the user interface, along with options or selections, such that the user may continually or periodically interact with the user interface. In this manner, user engagement metrics may be received for future playlist and media content generation. Block 306 may be followed by block 308.

At block 308, a second playlist may be generated based on the second set of media content recommendations and the third set of media content recommendations. For example, the generating is via the API and in response to an identifier of a computing device associated with the user account. In this manner, a device ID can be used to identify preferences, playback history, and others associated with the device, such that media content recommendations overcome drawbacks associated with repetitive or overlapping content between playlists. Furthermore, in some instances, a user account ID may also be used to identify preferences, playback history, and others associated with a user. Block 308 may be followed by block 310.

At block 310, the first playlist and the second playlist are provided to at least one of the one or more media applications associated with the user or user account. For example, the exposed API may provide the playlists as a response to the API function calls.

In some implementations, the playlists are provided directly to a media application executing on a user device.

In some implementations, the playlists are provided to a third-party media service issuing the initial API function call for the playlist generation. Other variations may also be applicable.

After providing the playlists, the media service and/or third-party media service may request augmentation of the playlists for continued playback. For example, if a user is interacting with and/or listening to a playlist, and the playlist is approaching a terminal media content item, the playlist may be augmented with one or more media content items that are cached from the sets of media content recommendations. As such, in some implementations, a playlist is not finite, but can be expanded based on a plurality of aspects or conditions.

In some implementations, any playlist may be continually augmented based upon user preferences, user consumption history data, and other data.

In some implementations, any playlist may be continually augmented based upon user request to continue listening to similar media content items.

In some implementations, any playlist may be continually augmented based upon a third-party request to provide further playlist media content items.

The media content recommendations may be cached at the service provider network, at the user device, or a combination thereof. In this manner, network bandwidth use may be reduced, storage capacity and compute cycles may be reduced, and other technical benefits may be realized. Additionally, through intelligent caching of provided media content recommendations, repetitive generation of media content items for a single user or device may be reduced. In these and other scenarios, re-generation of media content item recommendations may be based upon any conditional, such as a threshold increase in user preference or playback history being available or newly stored, a threshold increase in user engagement metrics, time of day, physical location, and others. Accordingly, benefits related to data storage, compute cycles, and network bandwidth are realized through the implementations described herein.

In addition to providing all or many available media content recommendations via a playlist based on user preferences, other variations may be applicable. For example, in some implementations, a subset of generated media content recommendations may be obfuscated or limited such that they do not appear on playlists. The obfuscation may be applied based on user preferences, selections, and others.

For example, a user may not wish to hear music that is related to heartbreak, emotional distress, or other personal scenarios during a particular time period. Through input of preferences using a displayed user interface, the user may be provided with music that lacks the particular musicality associated with emotional distress and heartbreak. Somewhat similarly, a user may wish not to hear fast or rapid drum beats while at a particular location (e.g., such as a meditation studio). The user may input such preferences such that when a playlist is requested but user profile data suggests the user is in a location associated with a low desire to hear fast or rapid drum beats, the user may be provided with playlists that do not include musicality associated with fast or rapid drums.

In addition to avoiding particular types or music or media that includes a particular musicality, playlists may also be generated to transition between different aspects of musicality. For example, a user may enjoy transitioning between a particular genre of music while leaving work and commuting. In these scenarios, playlists may be generated that transition between a user's preferences for work-time listening to commute-time listening, automatically. Other transitions, such as between disparate artists, different labels, and others, may also be applicable. In some cases, a playlist may accomplish one or more transitions between different types or variations of media content by incorporating recommendations from different machine learning models in different proportions and/or combinations. For instance, in a playlist having 100 songs that transition from style A to style B, the first 10 songs may have 9 songs of style A recommended by model A and 1 song of style B recommended by model B, songs 11-20 may have 8 songs of style A recommended by model A and 2 songs of style B recommended by model B, and so forth. Examples are considered in which musicality factors are used to provide recommendations by the machine learning models to transition as well, such as tempo, pitch, rhythm, melody, and so on.

In some cases, a playlist may transition between two or more different types of variations of media content by incorporating recommendations from other machine learning models in addition to the examples provided above. For instance, in a playlist having 100 songs that transition from a first style recommended by model A, a second style by model B, and a third style by model C, the first 10 songs may have 8 songs of style A recommended by model A, 1 song of style B recommended by model B and 1 song of style C recommended by model C, songs 11-20 may have 6 songs of style A recommended by model A, and 2 songs of style B recommended by model B and 2 songs of style C recommended by model C, and so forth.

In some cases, a playlist may transition back and forth between different styles of music, genres of music, and others, based upon context, user account ID, device ID, and other indicators of context. For instance, positioning data based on the device ID, schedule data based on the user account ID, and other context indicators may be used to inform playlist generation and transitions. Other examples may also be applicable.

As described above, methods of providing media content recommendations include generating, by a plurality of machine learning algorithms, a first set of media content recommendations, a second set of media content recommendations, and a third set of media content recommendations. In some examples, methods can also include generating a first playlist based on the first set of media content recommendations and the second set of media content recommendations. For example, the first playlist may be based on a combination of machine learning models. In some examples, methods can also include generating a second playlist based on the second set of media content recommendations and the third set of media content recommendations. For example, the second playlist may be based on a different combination of machine learning models than the first playlist. In some examples, methods can also include providing the first playlist and the second playlist to the one or more media applications.

Hereinafter, a method of requesting different playlists with different user input is described more fully with reference to FIG. 4.

Figure 4:
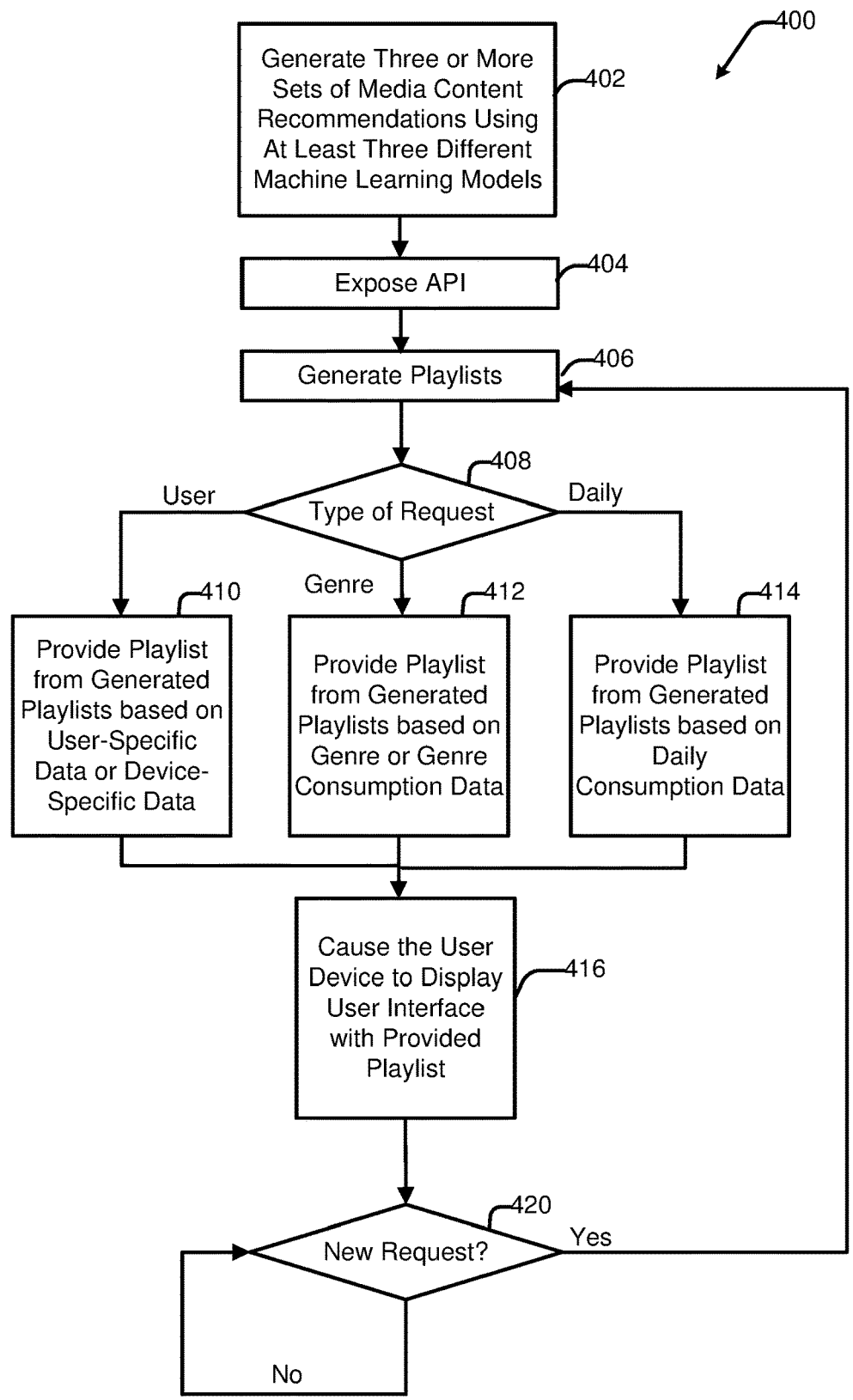
FIG. 4 is a flowchart showing aspects of a method for media content recommendations, according to an implementation presented herein.

FIG. 4 is a flowchart showing aspects of a method for providing media content recommendations, according to an implementation presented herein. Method 400 may be performed during playback of media content items at a user device implementing techniques described herein. Method 400 may begin at block 402.

At block 402, three or more sets of media content recommendations may be generated using multiple (e.g., three) machine learning models. For example, the machine learning models may be similar models, different models, or combinations of models. Additionally, the media content recommendations may be based on input data such as user profile data, user consumption history, similar groups of users, and others. Block 402 may be followed by block 404.

At block 404, an API is exposed to external services and/or service providers. For example, the API may be exposed by a server, such that a third-party service provider may access functionality described herein. Block 404 may be followed by block 406.

At block 406, playlists are generated by a playlist service of a service provider network. The generated playlists may be based on prior user consumption history, engagement data, and/or others.

In some implementations, a new playlist may be generated at block 406 while also allowing for playlist augmentation. For example, a media service and/or third-party media service may request augmentation of existing playlists for continued playback. For example, if a user is interacting with and/or listening to a playlist, and the playlist is approaching a terminal media content item, the playlist may be augmented with one or more media content items that are cached from the sets of media content recommendations associated with block 402. As such, in some implementations, a playlist is not finite, but can be expanded based on a plurality of aspects or conditions. Block 406 may be followed by block 408.

At block 408, a type of user request for playlist (or alternatively, a type of third-party request embedded in an API function call) may be determined. For example, a user or third-party request may include a request type. The request type may identify whether the request is for personalized or user-specific recommendations, for genre-specific recommendations, for recommendations based on what similar users have consumed, for recommendations based on daily or weekly or monthly consumption data, for recommendations based on recent consumption data, for recommendations based on less recent consumption (i.e., what I used to listen to in college), and/or others including playlist alterations, augmentations, and so on. Accordingly, while block 408 denotes only 3 options, it should be readily understood that a significant number of variations may be applicable. While only 3 variations are illustrated for the sake of clarity, the illustrated blocks may be altered to any request type.

Block 408 may be followed by one of blocks 410, 412, or 414, based upon the received gesture input. For example, block 408 may be triggered by a request for personalized recommendations, block 310 may be triggered by a request for genre-based recommendations, and block 312 may be triggered by a request for today's popular hits.

Blocks 410, 412, and 414 may be followed by block 416.

At block 416, the user device may be caused to display a user interface with the provided playlist. The user may initiate playback, or playback may initiate automatically. Block 416 may be followed by block 420.

Block 420 may direct the method 400 to iterate back to block 406 upon receipt of a new user input, user request, third-party request, or other request for a different playlist. In this manner, the method 400 may repeat as necessary depending upon user interaction with the provided user interface, media content items, and playlists.

As described above, different playlists may be provided based upon a user request and/or a third-party request. The different playlists may be generated by a playlist service at a service provider network, and provided for display in a user interface at a user device.

Hereinafter, a method of media content recommendations using specific machine learning algorithms is described more fully with reference to FIG. 5.

Figure 5:
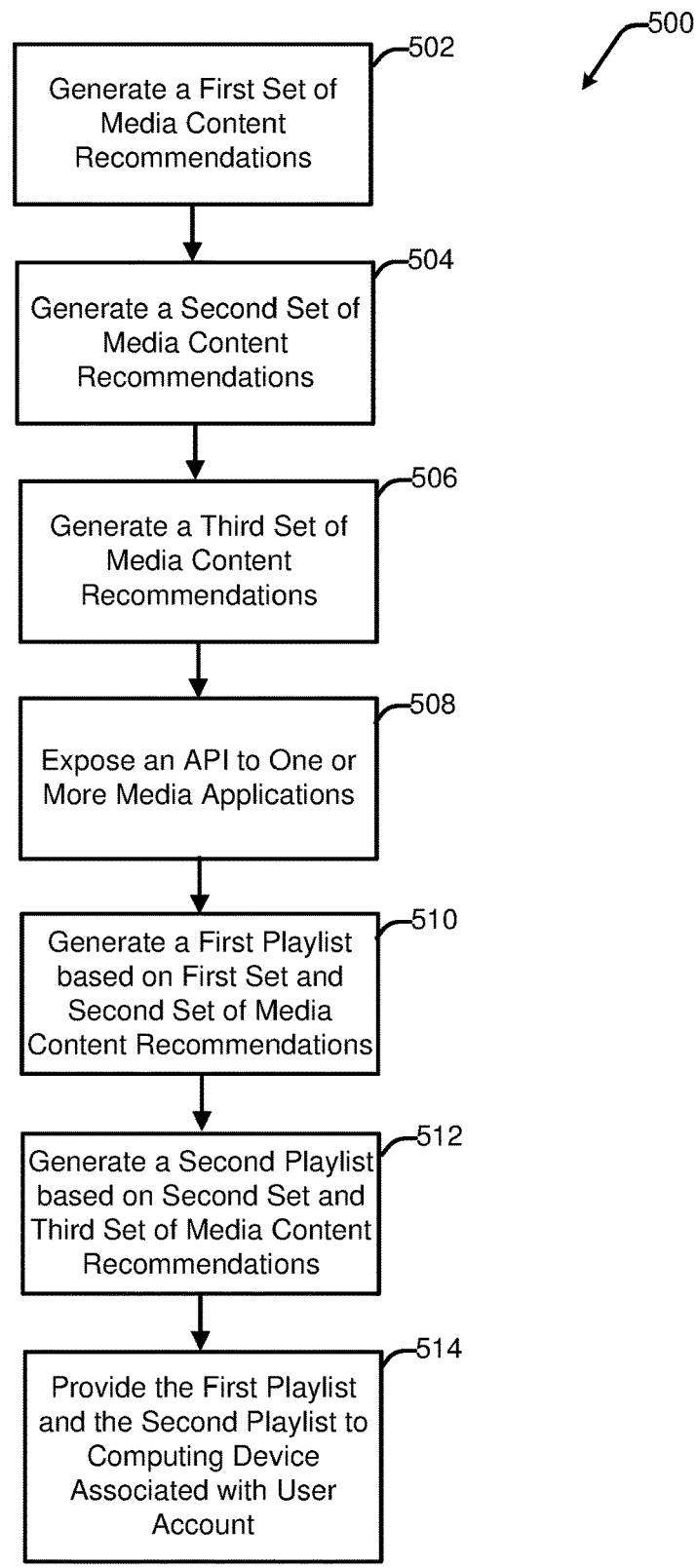
FIG. 5 is a flowchart showing aspects of a method for media content recommendations, according to an implementation presented herein.

FIG. 5 is a flowchart showing aspects of a method for providing media content recommendations, according to an implementation presented herein.

At block 502, a first set of media content recommendations is generated by a first machine learning algorithm. The first set of media content recommendations may be based on a content consumption history associated with a user account.

For example, content consumption history may include a user's prior interaction history with a service provider network. The content consumption history may include playback of one or more media content items from, for example, a public streaming channel, a private or VIP streaming channel, or a "streaming radio" streaming channel. The content consumption history may include playback of one or more media content items from a personal library of media content items stored at a service provider network, a private library of media content items stored at a service provider network, and/or a preferred library of media content items stored at a service provider network. Other sources for media content playback history, interaction, and/or consumption may also be applicable, including third-party sources. Block 502 is followed by block 504.

At block 504, a second set of media content recommendations is generated by a second machine learning algorithm. The second set of media content recommendations may be based on the content consumption history associated with the user account. Furthermore, the second set of media content recommendations may include different recommendations than the first set of media content recommendations.

For example, the content consumption history associated with the first set of media content recommendations may use the same or different sources than the second set of media content recommendations. Additionally, the second set of media content recommendations may be based upon a different machine learning algorithm and/or combination of machine learning algorithms than the first set of media content recommendations.

In some instances, the different sources of consumption history can be device-based instead of user-based. In these and other examples, the device-based consumption history may include a device's playback of one or more media content items from, for example, a public streaming channel, a private or VIP streaming channel, or a "streaming radio" streaming channel. The device's consumption history may include playback of one or more media content items from a personal library of media content items stored at a service provider network or on the device, a private library of media content items stored at a service provider network or on the device, and/or a preferred library of media content items stored at a service provider network or on the device. Other sources for media content playback history, interaction, and/or consumption may also be applicable, including third-party sources that have been accessed by the device. Block 504 is followed by block 506.

At block 506, a third set of media content recommendations is generated by a third machine learning algorithm. The third set of media content recommendations may be based on the content consumption history associated with the user account. Furthermore, the third set of media content recommendations may include different recommendations than the first set of media content recommendations and the second set of media content recommendations.

For example, the content consumption history associated with the first set of media content recommendations and the second set of media content recommendations may use the same or different sources than the third set of media content recommendations. Additionally, the third set of media content recommendations may be based upon a different machine learning algorithm and/or combination of machine learning algorithms than the first set of media content recommendations and the second set of media content recommendations.

In some instances, the third set of media content recommendations may include content consumption history that is similar or different from the examples listed above as related to the first and second set of media content recommendations.

As explained above, the generation of the first, second, and third sets of media content recommendations include different recommendations. In this manner, blocks 502-506 may overcome drawbacks associated with repetitive items in playlists. Block 506 is followed by block 508.

At block 508, an API is exposed to one or more media applications. The exposed API may be accessible by at least one third-party network. The third-party network may include a third-party media service executing thereon, and may issue API function calls to the service provider network for playlist generation and media content recommendations.

The third-party network may be accessible by a user device associated with the user account ID and/or device ID. Thus, the third-party network may, in some instances, provide the user account ID or device ID as part of an API function call. Block 508 is followed by block 510.

At block 510, a first playlist is generated based on a first subset of media content recommendations from the first set of media content recommendations and a second subset of media content recommendations from the second set of media content recommendations. First playlist generation may be via the API and in response to a user input through at least one of the one or more media applications.

For example, a user may make a selection to request an automatically generated playlist, or a partially automatically generated playlist. The third-party network may receive the user request and transmit at least a portion of data related to the user request to the service provider network through an API function call. Block 510 is followed by block 512.

At block 512, a second playlist is generated based on the second subset of media content recommendations and a third subset of media content recommendations from the third set of media content recommendations. Second playlist generation may be via the API and in response to an identifier of a computing device associated with the user account.

For example, a user may make another selection to request an automatically generated playlist, or a partially automatically generated playlist. The third-party network may receive the user request and transmit at least a portion of data related to the user request to the service provider network through an API function call. In some instances the user makes a single request, and the third-party network issues different requests to access different machine learning model outputs and/or sets of media content recommendations. In other examples, a playlist service at the service provider network automatically generates the first and second playlists based on at least one API function call made by the third-party network. Block 512 is followed by block 514.

At block 514, the first playlist and the second playlist are provided to the computing device associated with the user account. For example, the API may direct the transmission of the first and second playlist to the computing device, to a media application, and/or to a third-party media application, based on input arguments and variables associated with the API function calls.

As described above, a method of media content recommendations may leverage multiple (e.g., two, three or more) trained machine learning algorithms to generate media content recommendations based on user consumption history. Subsets of those generated media content recommendations may be used to curate two or more playlists. For example, different user data, device data, and others, may be used to provide the two playlists with limited repetition of similar items and/or limited overlap. The curated playlists may be transmitted to a user device, a third-party media application, or a media application executing on a user device, such that the user may listen to media content items from the playlist.

As further described above, the media application executing on the user device may present a user interface. The user interface may be a graphical user interface (GUI) that provides options and/or fields for entry of user preferences. Furthermore, requests for new playlists, different playlists, artists, genres, and others may be effectuated through manipulation of different GUI elements by a user.

Figure 6:
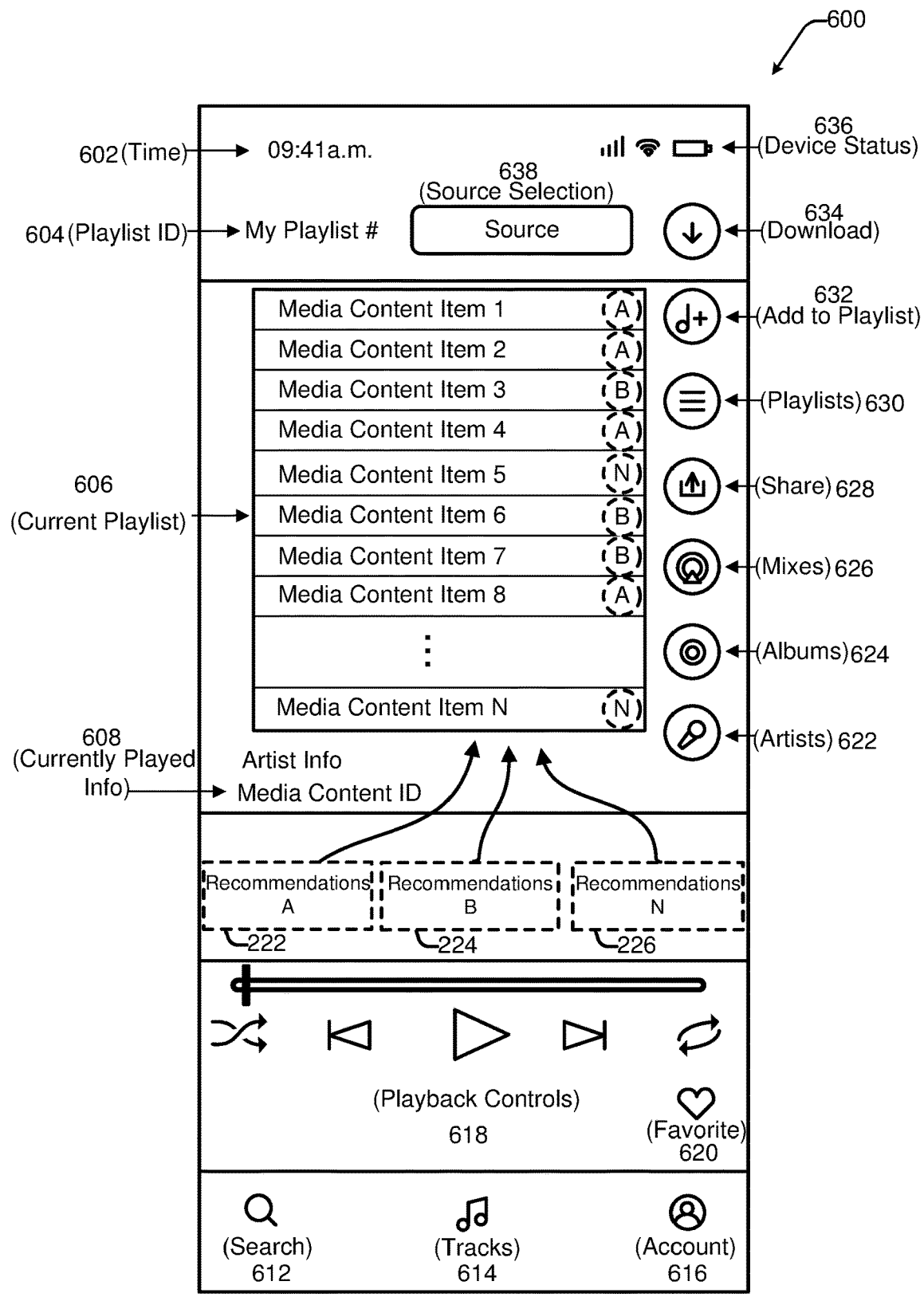
FIG. 6 is a schematic of a user interface for media content item listening, according to an implementation presented herein.

FIG. 6 is a schematic of a user interface for media content item listening, according to an implementation presented herein. The user interface 600 may be rendered on a display device of a computing device, such as the user device 102, in some implementations. The display device may include any suitable display device, including, for example, a touchscreen computer monitor, touch-sensitive display screen, and/or other suitable touch-sensitive display device. It is noted that in some implementations, an accessibility device to aid in inputting gestures or requests may be used in combination or in lieu of a touch-sensitive display device. Furthermore, other input devices instead of touchscreen (e.g., electronic pens, mouses, trackpads, keyboards, and others) may also be applicable.

The user interface 600 includes a display of a current time 602, a playlist ID 604, current playlist 606, and information about the currently played media content item 608. The current time 602 may be provided by a hardware clock or software clock on the user device. The playlist ID 604 may be identified by a user designation (e.g., "my current favorites for workouts") or by another designation. The current playlist 606 may depict media content items (e.g., illustrated as media content items 1 through N) that are presently in queue for playback. In some instances, playlist history may also be displayed, for example, with visual cues as to which content items have been previously played, are currently being played, and are queued for playback next. Other variations may also be applicable.

In some implementations, the displayed current playlist 606 may be replaced by another display, such as, for example, album artwork, media content item artwork, current news associated with an underlying artist, media content item, and/or genre, and others. The another display may also include, in some examples, a display of musicality changes in the current playlist, a display of genre changes in the current playlist, a display of different colors/highlights based on a currently played media content item, and others. Such different displays may be user configurable and/or automatic in some instances.

In some implementations, designations of a source of a media content item recommendation may be displayed for a user. For example, an identification of an automatically generated media content item recommendation may be displayed near or proximate the media content item entry in the current playlist so that a user may readily identify recommended tracks from user-preferred tracks. Additionally, other UI controls may be displayed to allow a user to denote agreement or disagreement with recommendations to inform machine learning model training.

The user interface 600 also includes a search function 612, track selection function 614, and user account access 616. The search function 612 may initiate a text-input-display such that a user can input text or other data to use in a search of available media content items. Track selection function 614 may initiate track selection functionality of an album or playlist associated with the currently played media content. User account access may initiate access to change user preferences, update account information, update payment information, and others. In some implementations, user account access requires password protection and/or other secure techniques to secure user data.

The user interface 600 also includes playback controls 618 and favorite designation selection 620. The playback controls 618 may function similar to typical music playback controls. Furthermore, the favorite designation selection 620 may allow a user to provide explicit feedback related to the currently played media content item.

The user interface 600 also includes a device status 636, a download function 634, and a source selection 638. The device status 636 may include information received from the user device, software components executing thereon, and/or hardware components associated therewith. In at least one implementation, the device status 636 is controlled by an underlying operating system of the user device. The download function 634 initiates a download of the currently played media content item to the user device for offline playback.

The source selection 638 allows selection of different sources for playlist generation. In some implementations, the source selection 638 includes two or more optional data sources for media content items.

The user interface 600 also includes a plurality of optional floating interface elements. The floating interface elements may include artists selection 622, albums selection 624, mixes selection 626, share selection 628, playlists selection 630, and add-to-playlist selection 632. The floating interface elements may be optional.

As further shown, recommendations A 222, recommendations B 224, and recommendations B 226 are illustrated in dashed lines to denote the use of media content recommendations from one or more of the sets of recommendations in curation of the current playlist 606. It is noted that while illustrated, the sets of recommendations A, B, and N may not be displayed at the user interface 600.

For example, different media content items from each set of recommendations are interspersed within the current playlist 606 and denoted with a dashed circular label showing a source set of recommendations. In this example, media content items from three different machine learning models are used to generate the current playlist 606.

In some instances, two or more sets of recommendations are used to generate the current playlist 606 (or another playlist). In some instances, three or more sets of recommendations are used to generate the current playlist 606 (or another playlist). In these and other examples, the ranking and placement of each recommendation may be based upon the actions of the playlist service (e.g., such as playlist service 142). In this manner, the playlist service may govern ranking and interspersal of recommendations based upon, for example, the user account ID, the device ID, context, playback history, user preferences, and others. Furthermore, particular sets of recommendations from particular combinations of machine learning models may also be determined by the playlist service.

In some instances, other displays of playlists may be appropriate. For example, different highlighting, gradients, shading, and other visual indicators may be displayed based upon a currently playing or selected playlist. In these examples, the visual indicators may be based on context, playlist genre, playlist type, playlist sources, and other contextual data. For example, a mellow playlist during a workday may be displayed differently than an active playlist during a user's scheduled workout. Similarly, a playlist curated for a user's commute may be displayed differently than a playlist curated for a user's at-home listening session. In these and other examples, the format of display may be altered to make different UI elements more visible (e.g., when working out), with larger text and/or simplified (e.g., when a user is operating a motor vehicle to avoid driver distractions), with more selectable options (e.g., when a user is listening at-home or at-work), and others.

The user interface 600 may be transmitted to a user device upon request, similar to the illustration of FIG. 1. Furthermore, use of the user interface 600 may generally allow input of specific playlist generation requests (e.g., as in method 400), particular user preferences for recommendations (e.g., as in methods 300, 400, and 500), and others.

Figure 7:
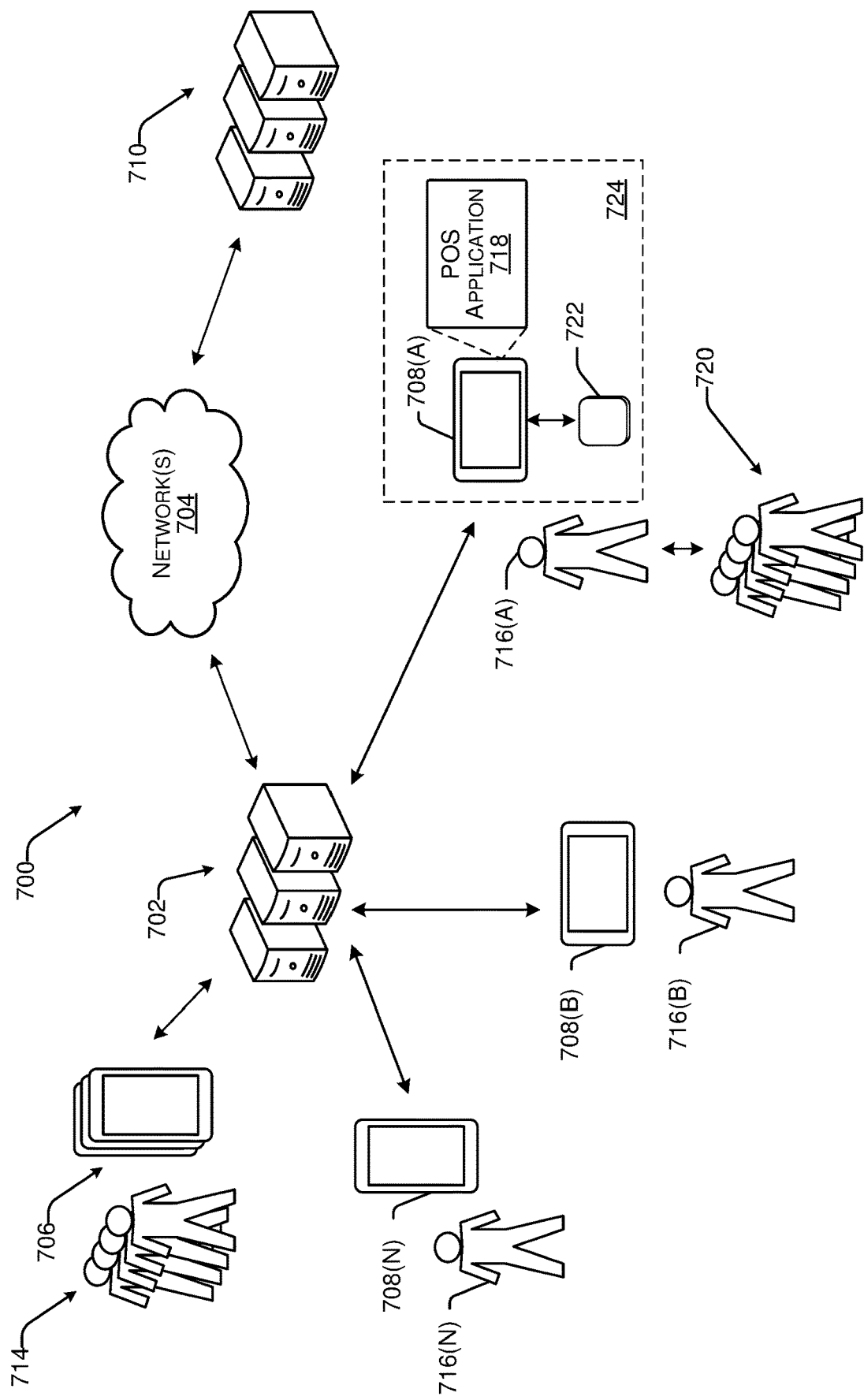
FIG. 7 illustrates an example environment that may employ the techniques presented herein to effectuate monetization of performances, according to an implementation presented herein.

FIG. 7 illustrates an example environment 700. The environment 700 includes server(s) 702 that can communicate over a network 704 with user devices 706 (which, in some examples can be merchant devices 708 (individually, 708(A)-708(N))) and/or server(s) 710 associated with third-party service provider(s). The server(s) 702 can be associated with a service provider that can provide one or more services for the benefit of users 714, as described below. Actions attributed to the service provider can be performed by the server(s) 702.

In some implementations, the servers 702 are associated with the service provider network 104. Additionally, merchant devices 708 may also be associated with content creators who create media content items for playback, in some implementations. In these example scenarios, monetization of content created using the described technologies may be distributed, streamed, and/or paid for, and revenue associated with a content creator may be credited (e.g., based on any particular crediting formula, portioning, or other method) to an associated content creator.

The environment 700 can include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

As described above, in at least one example, the users 714 can include merchants 716 (individually, 716(A)-716(N)). In an example, the merchants 716 can operate respective merchant devices 708, which can be user devices 706 configured for use by merchants 716. For the purpose of this discussion, a "merchant" can be any entity that offers items (e.g., goods or services) for purchase or other means of acquisition (e.g., rent, borrow, barter, etc.). The merchants 716 can offer items for purchase or other means of acquisition via brick-and-mortar stores, mobile stores (e.g., popup shops, food trucks, etc.), online stores, combinations of the foregoing, and so forth. In some examples, at least some of the merchants 716 can be associated with a same entity but can have different merchant locations and/or can have franchise/franchisee relationships. In additional or alternative examples, the merchants 716 can be different merchants. That is, in at least one example, the merchant 716(A) is a different merchant than the merchant 716(B) and/or the merchant 716(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 708 can have an instance of a POS application 718 stored thereon. The POS application 718 can configure the merchant device 708 as a POS terminal, which enables the merchant 716(A) to interact with one or more customers 720. As described above, the users 714 can include customers, such as the customers 720 shown as interacting with the merchant 716(A). For the purpose of this discussion, a "customer" can be any entity that acquires items from merchants. While only two customers 720 are illustrated in FIG. 7, any number of customers 720 can interact with the merchants 716. Further, while FIG. 7 illustrates the customers 720 interacting with the merchant 716(A), the customers 720 can interact with any of the merchants 716.

In at least one example, interactions between the customers 720 and the merchants 716 that involve the exchange of funds (from the customers 720) for items (from the merchants 716) can be referred to as "transactions." In at least one example, the POS application 718 can determine transaction data associated with the POS transactions. Transaction data can include payment information, which can be obtained from a reader device 722 associated with the merchant device 708(A), user authentication data, purchase amount information, point-of-purchase information (e.g., item(s) purchased, date of purchase, time of purchase, etc.), etc. The POS application 718 can send transaction data to the server(s) 702 such that the server(s) 702 can track transactions of the customers 720, merchants 716, and/or any of the users 714 over time. Furthermore, the POS application 718 can present a UI to enable the merchant 716(A) to interact with the POS application 718 and/or the service provider via the POS application 718.

In at least one example, the merchant device 708(A) can be a special-purpose computing device configured as a POS terminal (via the execution of the POS application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the merchant device 708(A), such as a microphone port, a headphone port, an audio-jack, a data port, or other suitable port. In additional or alternative examples, the reader device 722 can be coupled to the merchant device 708(A) via another wired or wireless connection, such as via a Bluetooth®, BLE, and so on. In some examples, the reader device 722 can read information from alternative payment instruments including, but not limited to, wristbands and the like.

In some examples, the reader device 722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710, as described below. In this manner, the POS terminal and reader device 722 may collectively process transaction(s) between the merchants 716 and customers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the customers 720. In additional or alternative examples, the POS terminal can have a display integrated therein for presenting information to the customers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a customer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a customer 720 slides a card, or other payment instrument, having a magnetic strip through a reader device 722 that captures payment data contained in the magnetic strip. A dip is a card-present transaction where a customer 720 inserts a payment instrument having an embedded microchip (i.e., chip) into a reader device 722 first. The dipped payment instrument remains in the payment reader until the reader device 722 prompts the customer 720 to remove the card, or other payment instrument. While the payment instrument is in the reader device 722, the microchip can create a one-time code which is sent from the POS system 724 to the server(s) 710 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 720 may tap or hover his or her payment instrument (e.g., card, electronic device such as a smart phone running a payment application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 724, the server(s) 702, and/or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s) 704. The server(s) 702 may send the transaction data to the server(s) 710. As described above, in at least one example, the server(s) 710 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 710 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 710 associated therewith), and a payment authorization message is communicated from the issuer to the POS device via a path opposite of that described above, or via an alternate path.

As described above, the server(s) 710, which can be associated with payment service provider(s), may determine whether the transaction is authorized based on the transaction data, as well as information relating to parties to the transaction (e.g., the customer 720 and/or the merchant 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a merchant application and/or other functional components for communicating with the POS system 724 and/or the server(s) 710 to authorize or decline transactions.

Based on the authentication notification that is received by the POS system 724 from server(s) 702, the merchant 716(A) may indicate to the customer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the merchants 716 via the POS application 718. In additional or alternative examples, each service can be associated with its own access point (e.g., application, web browser, etc.).

The service provider can offer payment processing services for processing payments on behalf of the merchants 716, as described above. For example, the service provider can provision payment processing software, payment processing hardware and/or payment processing services to merchants 716, as described above, to enable the merchants 716 to receive payments from the customers 720 when conducting POS transactions with the customers 720. For instance, the service provider can enable the merchants 716 to receive cash payments, payment card payments, and/or electronic payments from customers 720 for POS transactions and the service provider can process transactions on behalf of the merchants 716.

As the service provider processes transactions on behalf of the merchants 716, the service provider can maintain accounts or balances for the merchants 716 in one or more ledgers. For example, the service provider can analyze transaction data received for a transaction to determine an amount of funds owed to a merchant 716(A) for the transaction. In at least one example, such an amount can be a total purchase price less fees charged by the service provider for providing the payment processing services. Based on determining the amount of funds owed to the merchant 716(A), the service provider can deposit funds into an account of the merchant 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 716(A) to a bank account of the merchant 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the merchant 716(A) can access funds prior to a scheduled deposit. For instance, the merchant 716(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 716(A) can have a payment instrument that is linked to the stored balance that enables the merchant to access the funds without first transferring the funds from the account managed by the service provider to the bank account of the merchant 716(A).

In at least one example, the service provider may provide inventory management services. That is, the service provider may provide inventory tracking and reporting. Inventory management services may enable the merchant 716(A) to access and manage a database storing data associated with a quantity of each item that the merchant 716(A) has available (i.e., an inventory). Furthermore, in at least one example, the service provider can provide catalog management services to enable the merchant 716(A) to maintain a catalog, which can be a database storing data associated with items that the merchant 716(A) has available for acquisition (i.e., catalog management services). In at least one example, the catalog may include a plurality of data items and a data item of the plurality of data items may represent an item that the merchant 716(A) has available for acquisition. The service provider can offer recommendations related to pricing of the items, placement of items on the catalog, and multi-party fulfillment of the inventory.

In at least one example, the service provider can provide business banking services, which allow the merchant 716(A) to track deposits (from payment processing and/or other sources of funds) into an account of the merchant 716(A), payroll payments from the account (e.g., payments to employees of the merchant 716(A)), payments to other merchants (e.g., business-to-business) directly from the account or from a linked debit card, withdrawals made via scheduled deposit and/or instant deposit, etc. Furthermore, the business banking services can enable the merchant 716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 716. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 712 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 714 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 716. In at least one example, the service provider can recommend and/or generate content items to supplement omni-channel presences of the merchants 716. That is, if a merchant of the merchants 716 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 714 to set schedules for scheduling appointments and/or users 714 to schedule appointments.

In some examples, the service provider can provide restaurant management services to enable users 714 to make and/or manage reservations, to monitor front-of-house and/or back-of-house operations, and so on. In such examples, the merchant device(s) 708 and/or server(s) 702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 710). That is, the service provider can offer IDV services to verify the identity of users 714 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 714 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) and/or the server(s) 710 via the network(s) 704. In some examples, the merchant device(s) 708 are not capable of connecting with the service provider (e.g., the server(s) 702) and/or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the merchant device(s) 708) and/or the server(s) 702 until connectivity is restored and the payment data can be transmitted to the server(s) 702 and/or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with server(s) 702 of the service provider. That is, techniques described herein are directed to a specific implementation—or, a practical application—of utilizing a distributed system of user devices 706 that are in communication with server(s) 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
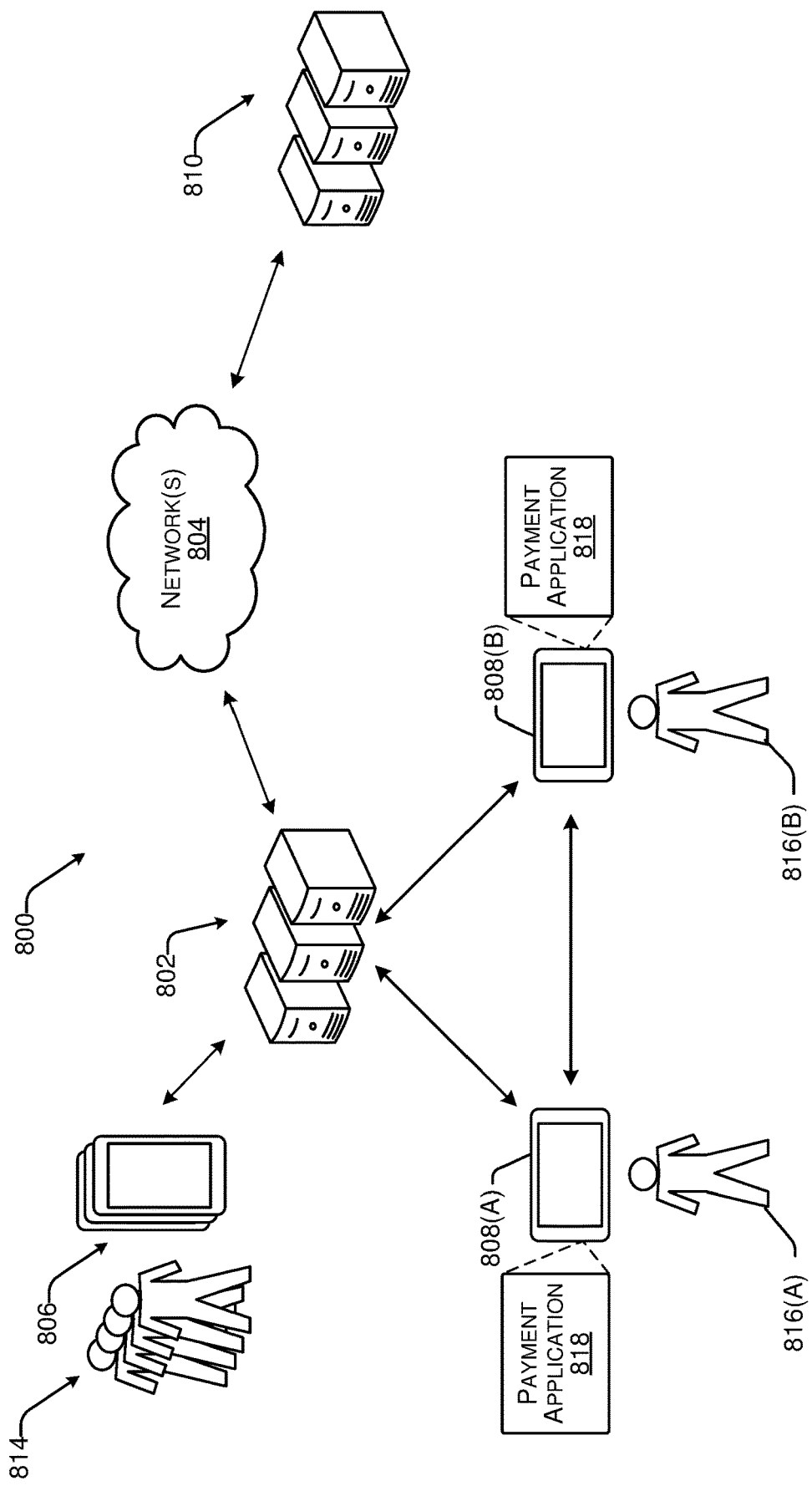
FIG. 8 illustrates an example environment that may employ the techniques presented herein to effectuate monetization of performances, according to an implementation presented herein.

FIG. 8 illustrates an example environment 800. The environment 800 includes server(s) 802 that can communicate over a network 804 with user devices 806 (which, in some examples can be user devices 808 (individually, 808(A), 808(B)) and/or server(s) 810 associated with third-party service provider(s). The server(s) 802 can be associated with a service provider that can provide one or more services for the benefit of users 814, as described below. Actions attributed to the service provider can be performed by the server(s) 802. In some examples, the service provider referenced in FIG. 7 can be the same or different than the service provider referenced in FIG. 8.

In some implementations, the servers 802 are associated with the service provider network 104. Additionally, devices 806 may also be associated with content creators and devices 808 may be associated with content creators or other users, in some implementations. In these example scenarios, monetization of content created using the described technologies may be distributed, streamed, and/or paid for, and revenue associated with a content creator may be credited (e.g., based on any particular crediting formula, portioning, or other method) to an associated content creator.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment application 818 (or other access point) installed on devices 806 configured for operation by users 814. In an example, an instance of the payment application 818 executing on a first device 808(A) operated by a payor (e.g., user 816(A)) can send a request to the service provider to transfer an asset (e.g., fiat currency, non-fiat currency, digital assets, cryptocurrency, securities, gift cards, and/or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 814. The ledger system can enable users 814 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment application 818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., 8Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 818 executing on the user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/8Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 806 (e.g., mobile device or conventional personal computer (PC)) based on instructions transmitted to and from the server(s) 802 (which, in such an example can be called a "messaging server"). In some instances, the messaging application can include a payment application with messaging capability that enables users of the payment application to communicate with one another. In such instances, the payment application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 814 to transfer fiat currency, non-fiat currency, cryptocurrency, securities, or other assets, or portions thereof, to other users 814. In at least one example, individual users can be associated with user accounts. Additional details associated with user accounts and the transfer of assets between users 814 are described below with reference to FIG. &.

Furthermore, the service provider of FIG. 8 can enable users 814 to perform banking transactions via instances of the payment application 818. For example, users can configure direct deposits or other deposits for adding assets to their various ledgers/balances. Further, users 814 can configure bill pay, recurring payments, and/or the like using assets associated with their accounts. In addition to sending and/or receiving assets via peer-to-peer transactions, users 814 buy and/or sell assets via asset networks such as cryptocurrency networks, securities networks, and/or the like.

Figure 9:
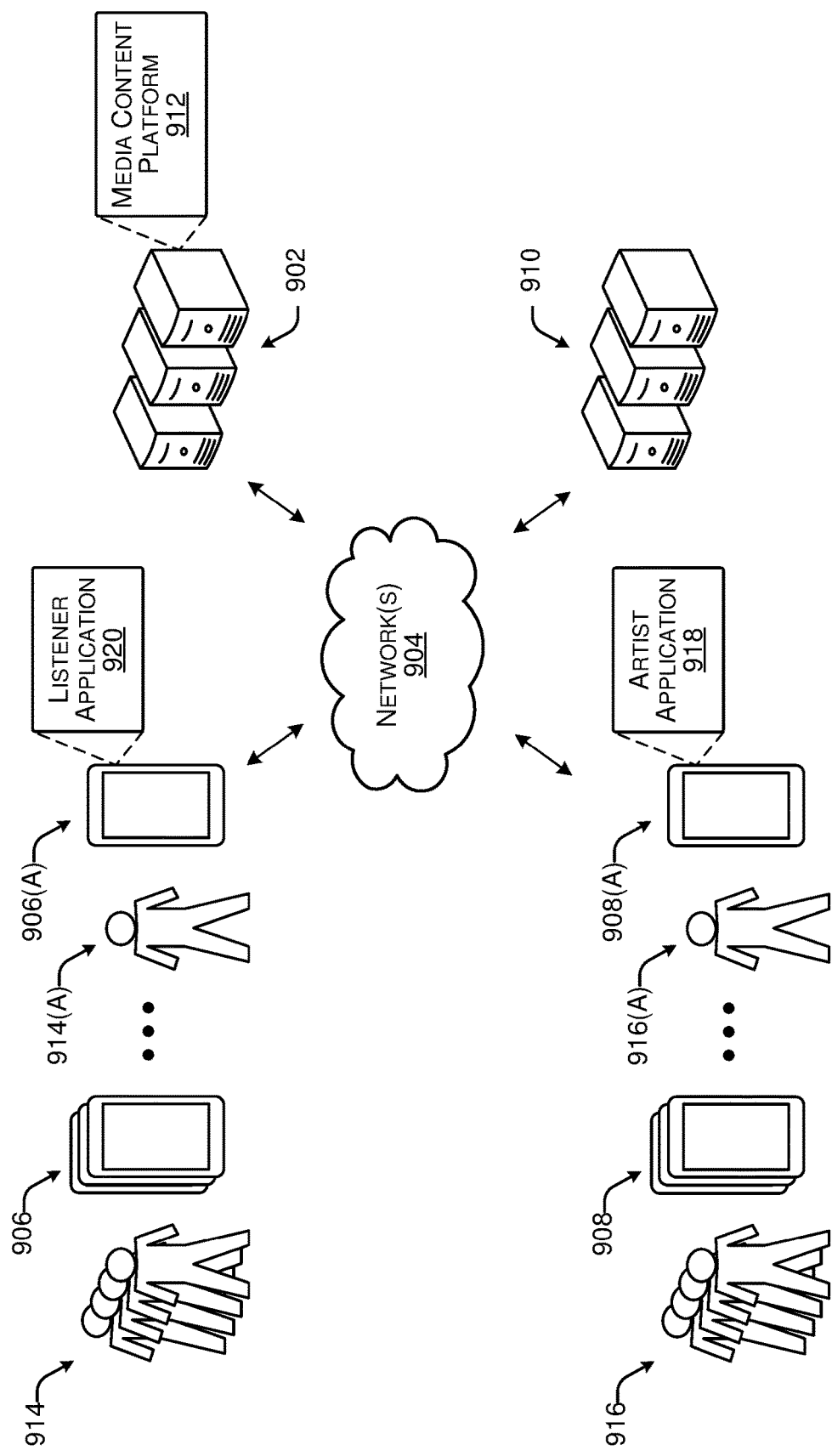
FIG. 9 illustrates an example environment that may employ the techniques presented herein, according to an implementation presented herein.

FIG. 9 illustrates an example environment 900. The environment 900 includes server(s) 902 that can communicate over a network 904 with user devices 906 (an individual instance of which is shown as user device 906(A)), as well as user devices 908 (an individual instance of which is shown as user device 908(A)) and/or server(s) 910 associated with third-party service provider(s). The server(s) 902 can be associated with a service provider that can provide one or more services for the benefit of users 914 and/or users 916, as described below. Actions attributed to the service provider can be performed by the server(s) 902. In some examples, the service provider referenced in FIGS. 7 and 8 can be the same or different than the service provider referenced in FIG. 9.

In some implementations, the servers 902 are associated with the service provider network 104. Additionally, user devices 906 and/or 908 may also be associated with content creators or users, in some implementations. In these example scenarios, monetization of content created using the described technologies may be distributed, streamed, and/or paid for, and revenue associated with a content creator may be credited (e.g., based on any particular crediting formula, portioning, or other method) to an associated content creator.

The environment 900 can include a plurality of user devices 906 and/or user devices 908, as described above. Each one of the plurality of user devices 906 and/or 908 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, an audio output device (e.g., a speaker), etc. In some examples, individual ones of the user devices can be operable by users 914 and/or the users 916. The users 914 and/or the users 916 can be referred to as customers, buyers, merchants, sellers, borrowers, employees, employers, payors, payees, couriers, artists, musicians, listeners, supervisors, hosts, audience members, and so on. The users 914 can interact with the user devices 906 via user interfaces presented via the user devices 906. Similarly, the users 916 can interact with the user devices 908 via user interfaces presented via the user devices 908. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914(A) and/or a user 916(A) can interact with the user interface via touch input, spoken input, or any other type of input.

In at least one example, the service provider can play digital media where playback may occur using "streaming" where the media is transmitted over the network to the media player or a media application executing on a device (e.g., speaker), which decodes and plays the media while data is being received. The media may be played using characteristics, e.g., of the network, indicated via bit rate to account for variable latency and bandwidth within the communications network. In some cases, a buffer queues some of the audio/video data ahead of the media actually being played. During moments of network congestion, which leads to lower available bandwidth, less audio/video data is added to the buffer, which drains down as media is being de-queued during streaming playback. However, during moments of high network bandwidth, the buffer is replenished, adding data to the buffer.

In at least one example, the service provider can provide a digital media streaming service (e.g., subscription-based, non-subscription-based) that enables the user devices 906 to stream and/or download digital media via a listener application 920 installed on the individual user devices 906. For instance, the digital media streaming service may be a digital audio streaming service (e.g., for music, podcasts, audiobooks, etc.), a digital video streaming service, and/or a streaming service that provides streaming of various different types of digital media or multimedia. In examples, the digital media streaming service may enable the users 914 to stream digital media items (e.g., songs, podcasts, videos, audiobooks, etc.) on-demand from a centralized library provided by the digital media streaming service via the listener application 920 on the user devices 906, and/or from a variety of different decentralized sources. Alternatively or additionally, the digital media streaming service may provide functionality to the users 914 to download digital media items (e.g., songs, podcasts, videos, audiobooks, etc.) from the centralized library or decentralized sources to be stored locally on the user devices 906 and subsequently accessed using the listener application 920. In such cases where digital media items are downloaded and stored locally on the user devices 906, the listener application 920 may verify access rights to the digital media items at time intervals, for instance intermittently (e.g., when the user device 906 has a network connection with the media content platform 912 via the network(s) 904), and/or at regular intervals (e.g., daily, weekly, monthly, etc.). In examples, access rights to the digital media items may be provided when a subscription to the digital media streaming service is active, while access rights to the digital media items may be withheld when the subscription to the digital media streaming service is terminated. Enabling storage on the user devices 906 and subsequent access to digital media items via the listener application 920 provides the users 906 with the ability to access the digital media items "offline" such as when a connection to the digital media streaming service via the network(s) 904 is unavailable or unreliable.

In some examples, the service provider may additionally or alternatively provide an artist management service that enables the users 916 to manage aspects of artist business via an artist application 918 installed on the user devices 908, such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some examples, the users 916 can access all of the services of the artist management service. In other examples, the users 916 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 916 may have access to a single user account via respective user devices 906, with the various users 916 having different access privileges to services provided by the artist management service. In a non-limiting example, an artist may have access to all of the service of the artist management service; a personal manager may have access to marketing, cash flow management, publishing, CRM, social media, event coordination, and industry communications; a business manager may have access to regulatory obligations and cash flow management; and an attorney may have access to regulatory obligations, cash flow management, publishing, event coordination, and industry communications. Accordingly, an artist can designate functions provided by the artist management service to different members of the team associated with the artist, thus granting the respective team members access to services suited to the skills of the individual team members.

In some cases, the artist application 918 and the listener application 920 may be distinct applications having differing user experiences and verification processes for access, such as illustrated in the environment 900. For instance, the service provider may request additional verification, such as a link to an artist website, a sample of an artist's work, a verified credential supplied by a third party, etc. to grant access to the artist application 918 in addition to information requested to access the listener application 920. Further, the artist application 918 may provide the artist management services described herein, without the subscription-based digital media streaming services described herein, and vice versa. However, examples are also considered in which functionality provided by the artist application 918 and the listener application 920 partially or fully overlap, and/or where verification processes for access are substantially similar.

In at least some examples, the service provider enables interaction between the users 914 utilizing the listener application 920 installed on the user devices 906, and the users 916 utilizing the artist application 918 installed on the user devices 908. For example, the service provider may provide the subscription-based digital media streaming service features described above, the artist management service features described above, as well as interconnectivity between the subscription-based digital media streaming service and the artist management service. Functionality provided by the service provider in such instances may include a communication channel between one or more of the users 914 (e.g., a listener, fan, music supervisor, publisher, etc.) utilizing the listener application 920 and a particular user 916(A) (e.g., an artist) utilizing the artist application 918. Examples are also considered in which the service provider provides a communication channel between one or more of the users 916 (e.g., an artist) utilizing the artist application 918 and a particular user 914(A) (e.g., a listener, fan, music supervisor, publisher, etc.) utilizing the listener application 920. The communication channel may include, for instance, a messaging platform (also referred to as a "messaging application" herein), a live streaming platform, a videoconferencing or teleconferencing platform, or a combination of these.

Additionally, in some cases, the service provider may facilitate a resource transfer between the listener application 920 and the artist application 918. In an example, the service provider may direct a resource, such as a portion of a subscription fee paid by the user 914(A), to one or more of the users 916 based on a number of instances that the user 914(A) consumed (e.g., streamed, downloaded, etc.) content created by respective ones of the users 916. Alternatively or additionally, the service provider may direct a resource, such as funds, from an account associated with the user 914(A) to an account associated with the user 916(A) (or vice versa), in accordance with transfers between accounts as described herein. The service provider may facilitate resource transfers in examples such as merchandise purchases, event ticket purchases, "tipping" an artist, payments for royalties or other fees, and so forth.

In some examples, the service provider enables interaction between individual ones of the users 914 with one another via the listener application 920 installed on the user devices 906. Similar to the discussion above, the service provider may provide a communication channel between individual ones of the users 914 via respective listener applications 920 installed on the user devices 906. The communication channel may include, for instance, a messaging platform (also referred to as a "messaging application" herein), a live streaming platform, a videoconferencing or teleconferencing platform, or a combination of these. In an example, the listener application 920 may provide functionality via a communication channel for a user 914(A) to stream an individual digital media item, a playlist, or the like to an audience comprising other ones of the user devices 906. Alternatively or additionally, the communication channel may facilitate sharing of individual digital media items, playlists, user and/or artist profiles, and the like between the users 914 via messages, uniform resource locators (URLs), quick response (QR) codes, and so forth.

In some cases, the service provider enables interaction between individual ones of the users 916 with one another via the artist application 918 installed on the user devices 908. In examples, the service provider may provide a communication channel between individual ones of the users 916 via respective artist applications 918 installed on the user devices 908. In some instances, the service provider may provide recommendations for a particular user 916(A) indicating which of the other users 916 to communicate with. Such a recommendation may be based on a similarity (or dissimilarity) of content created by two or more of the users 916, an overlap (or lack thereof) of audience members of the users 916, a geographic location of the users 916, a coinciding event location of the users 916, and so forth. In some examples, the user 916(A) may input parameters for a desired connection via the artist application 918, and the service provider nay filter which of the users 916 to surface for recommendations to the user 916(A) based on the input parameters. Alternatively or additionally, the service provider may implement one or more machine learning models to filter which of the users 916 to surface for recommendations to the user 916(A). The recommendations provided by the service provider may be data driven and thus increase relevance of communications presented to the users 916 and reduce unsolicited communications that may be received by the users 916.

Whether or not a user 916(A) utilizes a recommendation provided by the service provider to conduct communication via the communication channel with other ones of the users 916, the communication channel may include various functionality for individual ones of the users 916 to communicate with one another. For example, the communication channel may include a messaging platform (also referred to as a "messaging application" herein), a live streaming platform, a videoconferencing or teleconferencing platform, or a combination of these. In an example, the artist application 918 may provide functionality via a communication channel for a user 916(A) to stream an individual digital media item, a playlist, or the like to an audience comprising the user devices 906 having a listener application 920 installed thereon. Alternatively or additionally, the communication channel may facilitate sharing of individual digital media items, playlists, an artist profile associated with the user 916(A) (or a different one of the users 916), and the like with the users 914 via messages, uniform resource locators (URLs), quick response (QR) codes, and so forth.

The media content platform 912 may interact with the server(s) 910 associated with the third-party service providers to, for instance, ingest digital media items, report digital media consumption data, pay royalties, and the like. In some examples, the server(s) 910 may be accessible by the service provider via one or more APIs or other integrations. In some cases, the third-party service provider may be a digital media content provider (e.g., a record label, a performance rights organization (PRO), an independent artist, etc.). In such cases, the service provider may receive digital media items from the server(s) 910, along with metadata associated with the digital media items. The metadata, in some instances, may indicate individual contributors to a digital media item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata, may indicate information such as release date, track title, track duration, clean or explicit version, jurisdiction information, and the like. The service provider may use the metadata to associate the digital media item as being created by a particular user 916(A), to provide search results to the users 914, to generate playlists, and so forth. Further, the service provider may provide payments (e.g., royalties) to the third-party service provider based on a number of streams and/or downloads of individual digital media items to the users 914 via the listener application 920.

Figure 10:
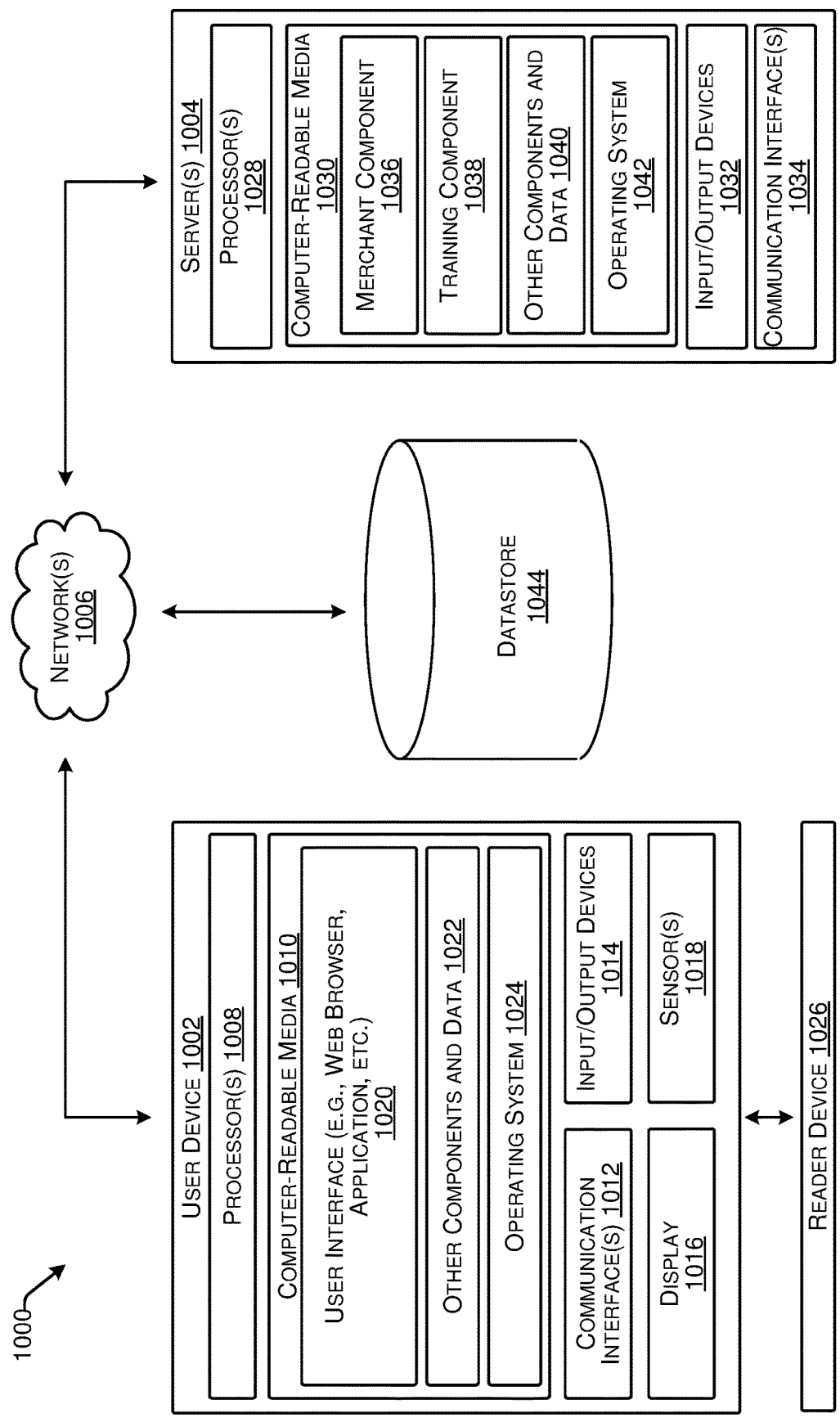
FIG. 10 illustrates a system that may employ the techniques presented herein, according to an implementation presented herein.

FIG. 10 depicts an illustrative block diagram illustrating a system 1000 for performing techniques described herein. The system 1000 includes a user device 1002, that communicates with server computing device(s) (e.g., server(s) 1004) via network(s) 1006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1002 is illustrated, in additional or alternate examples, the system 1000 can have multiple user devices, as described above with reference to FIG. 7 and FIG. 8.

In some implementations, the servers 1002 are associated with the service provider network 104. Additionally, user device 1002 and user interface 1020 may also be associated with content creators or users, in some implementations. In these example scenarios, the user interface 1020 may function at least somewhat similar to one or more of the user interfaces 700, 800, 802, 900, 902, 1000, 1002, 1100, 1102, and/or 1200.

In at least one example, the user device 1002 can be any suitable type of computing device, e.g., portable, semi-portable, semi-stationary, or stationary. Some examples of the user device 1002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1002 can be any computing device capable of sending communications and performing the functions according to the techniques described herein. The user device 1002 can include devices, e.g., payment card readers, or components capable of accepting payments, as described below.

In the illustrated example, the user device 1002 includes one or more processors 1008, one or more computer-readable media 1010, one or more communication interface(s) 1012, one or more input/output (I/O) devices 1014, a display 1016, and sensor(s) 1018.

In at least one example, each processor 1008 can itself comprise one or more processors or processing cores. For example, the processor(s) 1008 can be implemented as one or more microprocessors, microcomputers, microcontrollers, digital signal processors, central processing units, state machines, logic circuitries, and/or any devices that manipulate signals based on operational instructions. In some examples, the processor(s) 1008 can be one or more hardware processors and/or logic circuits of any suitable type specifically programmed or configured to execute the algorithms and processes described herein. The processor(s) 1008 can be configured to fetch and execute computer-readable processor-executable instructions stored in the computer-readable media 1010.

Depending on the configuration of the user device 1002, the computer-readable media 1010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1010 can include, but is not limited to, RAM, ROM, EEPROM, flash memory, solid-state storage, magnetic disk storage, optical storage, and/or other computer-readable media technology. Further, in some examples, the user device 1002 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 can be computer storage media able to store instructions, components or components that can be executed by the processor(s) 1008. Further, when mentioned, non-transitory computer-readable media exclude media such as energy, carrier signals, electromagnetic waves, and signals per se.

The computer-readable media 1010 can be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the user device 1002. Functional components stored in the computer-readable media 1010 can include a user interface 1020 to enable users to interact with the user device 1002, and thus the server(s) 1004 and/or other networked devices. In at least one example, the user interface 1020 can be presented via a web browser, or the like. In other examples, the user interface 1020 can be presented via an application, such as a mobile application or desktop application, which can be provided by a service provider associated with the server(s) 1004, or which can be an otherwise dedicated application. In some examples, the user interface 1020 can be similar to one or more of the user interfaces 700, 800, 802, 900, 902, 1000, 1002, 1100, 1102, and/or 1200. In at least one example, a user can interact with the user interface via touch input, spoken input, gesture, or any other type of input. The word "input" is also used to describe "contextual" input that may not be directly provided by the user via the user interface 1020. For example, user's interactions with the user interface 1020 are analyzed using, e.g., natural language processing techniques, to determine context or intent of the user, which may be treated in a manner similar to "direct" user input.

Depending on the type of the user device 1002, the computer-readable media 1010 can also optionally include other functional components and data, such as other components and data 1022, which can include programs, drivers, etc., and the data used or generated by the functional components. In addition, the computer-readable media 1010 can also store data, data structures and the like, that are used by the functional components. Further, the user device 1002 can include many other logical, programmatic, and physical components, of which those described are merely examples that are related to the discussion herein.

In at least one example, the computer-readable media 1010 can include additional functional components, such as an operating system 1024 for controlling and managing various functions of the user device 1002 and for enabling basic user interactions.

The communication interface(s) 1012 can include one or more interfaces and hardware components for enabling communication with various other devices, such as over the network(s) 1006 or directly. For example, communication interface(s) 1012 can enable communication through one or more network(s) 1006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1002 can further include one or more input/output (I/O) devices 1014. The I/O devices 1014 can include speakers, a microphone, a camera, and various user controls (e.g., buttons, a joystick, a keyboard, a keypad, etc.), a haptic output device, and so forth. The I/O devices 1014 can also include attachments that leverage the accessories (audio-jack, USB-C, Bluetooth, etc.) to connect with the user device 1002.

In at least one example, user device 1002 can include a display 1016. Depending on the type of computing device(s) used as the user device 1002, the display 1016 can employ any suitable display technology. For example, the display 1016 can be a liquid crystal display, a plasma display, a light emitting diode display, an OLED (organic light-emitting diode) display, an electronic paper display, or any other suitable type of display able to present digital content thereon. In at least one example, the display 1016 can be an augmented reality display, a virtually reality display, or any other display able to present and/or project digital content. In some examples, the display 1016 can have a touch sensor associated with the display 1016 to provide a touchscreen display configured to receive touch inputs for enabling interaction with a graphic interface presented on the display 1016. Accordingly, implementations herein are not limited to any particular display technology. Alternatively, in some examples, the user device 1002 may not include the display 1016, and information can be presented by other means, such as aurally, haptically, etc.

In addition, the user device 1002 can include sensor(s) 1018. The sensor(s) 1018 can include a GPS device able to indicate location information. Further, the sensor(s) 1018 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1002 can include various other components that are not shown, examples of which include removable storage, a power source, such as a battery and power control unit, a barcode scanner, a printer, a cash drawer, and so forth.

In addition, in some examples, the user device 1002 can include, be connectable to, or otherwise be coupled to a reader device 1026, for reading payment instruments and/or identifiers associated with payment objects. In some examples, as described above, the reader device 1026 can plug in to a port in the user device 1002, such as a microphone port, a headphone port, an audio-jack, a data port, or other suitable port. In additional or alternative examples, the reader device 1026 can be coupled to the user device 1002 via another wired or wireless connection, such as via a Bluetooth®, BLE, and so on. The reader device 1026 can include a read head for reading a magnetic strip of a payment card, and further can include encryption technology for encrypting the information read from the magnetic strip. Additionally or alternatively, the reader device 1026 can be an EMV payment reader, which in some examples, can be embedded in the user device 1002. Moreover, numerous other types of readers can be employed with the user device 1002 herein, depending on the type and configuration of the user device 1002.

The reader device 1026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1026 may include hardware implementation, such as slots, magnetic tracks, and rails with one or more sensors or electrical contacts to facilitate detection and acceptance of a payment instrument. That is, the reader device 1026 may include hardware implementations to enable the reader device 1026 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1026 may also include a biometric sensor to receive and process biometric characteristics and process them as payment instruments, given that such biometric characteristics are registered with the payment service and connected to a financial account with a bank server.

The reader device 1026 may include processing unit(s), computer-readable media, a reader chip, a transaction chip, a timer, a clock, a network interface, a power supply, and so on. The processing unit(s) of the reader device 1026 may execute one or more components and/or processes to cause the reader device 1026 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1026, the computer-readable media may include volatile memory (such as RAM), non-volatile memory (such as ROM, flash memory, miniature hard drive, memory card, or the like), or some combination thereof. In at least one example, the computer-readable media of the reader device 1026 may include at least one component for performing various functions as described herein.

The reader chip may perform functionalities to control the operations and processing of the reader device 1026. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1006, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1026. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1002, which can be a POS terminal, and the reader device 1026 are shown as separate devices, in additional or alternative examples, the user device 1002 and the reader device 1026 can be part of a single device, which may be a battery-operated device. In such an example, components of both the user device 1002 and the reader device 1026 may be associated with the single device. In some examples, the reader device 1026 can have a display integrated therewith, which can be in addition to (or as an alternative of) the display 1016 associated with the user device 1002.

The server(s) 1004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1004 can include one or more processors 1028, one or more computer-readable media 1030, one or more I/O devices 1032, and one or more communication interfaces 1034. Each processor 1028 can be a single processing unit or a number of processing units, and can include single or multiple computing units or multiple processing cores. The processor(s) 1028 can be implemented as one or more microprocessors, microcomputers, microcontrollers, digital signal processors, central processing units, state machines, logic circuitries, and/or any devices that manipulate signals based on operational instructions. For example, the processor(s) 1028 can be one or more hardware processors and/or logic circuits of any suitable type specifically programmed or configured to execute the algorithms and processes described herein. The processor(s) 1028 can be configured to fetch and execute computer-readable instructions stored in the computer-readable media 1030, which can program the processor(s) 1028 to perform the functions described herein.

The computer-readable media 1030 can include volatile and nonvolatile memory and/or removable and non-removable media implemented in any type of technology for storage of information, such as computer-readable instructions, data structures, program components, or other data. Such computer-readable media 1030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1004, the computer-readable media 1030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1030 can be used to store any number of functional components that are executable by the processor(s) 1028. In many implementations, these functional components comprise instructions or programs that are executable by the processors 1028 and that, when executed, specifically configure the one or more processors 1028 to perform the actions attributed above to the service provider and/or payment processing service. Functional components stored in the computer-readable media 1030 can optionally include a merchant component 1036, a training component 1038, and one or more other components and data 1040.

The merchant component 1036 can be configured to receive transaction data from POS systems, such as the POS system 624 described above with reference to FIG. 6. The merchant component 1036 can transmit requests (e.g., authorization, capture, settlement, etc.) to payment service server computing device(s) to facilitate POS transactions between merchants and customers. The merchant component 1036 can communicate the successes or failures of the POS transactions to the POS systems.

The training component 1038 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1002 and/or the server(s) 1004 for use at a time after the data models have been trained (e.g., at runtime).

The one or more other components and data 1040 can include one or more of the media service 140, playlist service 142, and others, the functionality of which is described, at least partially, above. Further, the one or more other components and data 1040 can include programs, drivers, etc., and the data used or generated by the functional components. Further, the server(s) 1004 can include many other logical, programmatic, and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1030 can additionally include an operating system 1042 for controlling and managing various functions of the server(s) 1004.

The communication interface(s) 1034 can include one or more interfaces and hardware components for enabling communication with various other devices, such as over the network(s) 1006 or directly. For example, communication interface(s) 1034 can enable communication through one or more network(s) 1006, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1004 can further be equipped with various I/O devices 1032. Such I/O devices 1032 can include a display, various user interface controls (e.g., buttons, joystick, keyboard, mouse, touch screen, biometric or sensory input devices, etc.), audio speakers, connection ports and so forth.

In at least one example, the system 1000 can include a datastore 1044 that can be configured to store data that is accessible, manageable, and updatable. In some examples, the datastore 1044 can be integrated with the user device 1002 and/or the server(s) 1004. In other examples, as shown in FIG. 10, the datastore 1044 can be located remotely from the server(s) 1004 and can be accessible to the server(s) 1004. The datastore 1044 can comprise multiple databases and/or servers connected locally and/or remotely via the network(s) 1006.

In at least one example, the datastore 1044 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1044 can store additional or alternative types of data as described herein.

Example Clauses

Clause 1. A computer-implemented method, comprising: generating, by a first machine learning algorithm, a first set of media content recommendations, the first set of media content recommendations being based on a content consumption history associated with a user account; generating, by a second machine learning algorithm, a second set of media content recommendations based on the content consumption history associated with the user account, the second set of media content recommendations having different recommendations than the first set of media content recommendations; generating, by a third machine learning algorithm, a third set of media content recommendations based on the content consumption history associated with the user account, the third set of media content recommendations having different recommendations than the first set of media content recommendations and the second set of media content recommendations; exposing an application programming interface (API) to one or more media applications; generating, via the API and in response to a user input through at least one of the one or more media applications, a first playlist based on a first subset of media content recommendations from the first set of media content recommendations and a second subset of media content recommendations from the second set of media content recommendations; generating, by the API and in response to an identifier of a computing device associated with the user account, a second playlist based on the second subset of media content recommendations and a third subset of media content recommendations from the third set of media content recommendations; and providing, by the API, the first playlist and the second playlist to the computing device associated with the user account.

Clause 2. The subject matter according to any preceding clause, further comprising anonymizing the content consumption history associated with the user account prior to providing the first playlist and the second playlist.

Clause 3. The subject matter according to any preceding clause, wherein the first machine learning algorithm, the second machine learning algorithm, and the third machine learning algorithm are deployed at a server hosting and exposing the API.

Clause 4. The subject matter according to any preceding clause, wherein the first machine learning algorithm, the second machine learning algorithm, and the third machine learning algorithm are at least partially deployed at the computing device, and wherein the API is hosted at a server remote from the computing device.

Clause 5. The subject matter according to any preceding clause, wherein the first machine learning algorithm, the second machine learning algorithm, and the third machine learning algorithm are each different machine learning models chosen from the group consisting of collaborative filtering models, two-tower models, and sequence models.

Clause 6. The subject matter according to any preceding clause, wherein the first machine learning algorithm, the second machine learning algorithm, and the third machine learning algorithm are one or more of collaborative filtering models, two-tower models, or sequence models.

Clause 7. The subject matter according to any preceding clause, further comprising augmenting the provided first playlist and the provided second playlist periodically.

Clause 8. The subject matter according to any preceding clause, further comprising, prior to generating the first playlist and the second playlist, caching the first set of media content recommendations, the second set of media content recommendations, and the third set of media content recommendations.

Clause 9. The subject matter according to any preceding clause, further comprising, prior to generating the first playlist and the second playlist, obfuscating at least a subset of the first set of media content recommendations, the second set of media content recommendations, or the third set of media content recommendations based on user preferences.

Clause 10. The subject matter according to any preceding clause, wherein at least one of the first playlist and the second playlist are configured to transition between one musicality aspect of media content contained therein based upon user preferences.

Clause 11. A computer-implemented method, comprising: generating, by a plurality of machine learning algorithms, a first set of media content recommendations, a second set of media content recommendations, and a third set of media content recommendations, wherein first set of media content recommendations, the second set of media content recommendations, and the third set of media content recommendations are based on a content consumption history associated with a user account, and wherein the first set of media content recommendations, the second set of media content recommendations, and the third set of media content recommendations include at least one different media content recommendation from one another; exposing an application programming interface (API) to one or more media applications; generating, via the API and in response to a user input associated with the one or more media applications, a first playlist based on the first set of media content recommendations and the second set of media content recommendations; generating, by the API and in response to an identifier of a computing device associated with the user account, a second playlist based on the second set of media content recommendations and the third set of media content recommendations; and providing, by the API, the first playlist and the second playlist to at least one of the one or more media applications.

Clause 12. The subject matter according to any preceding clause, further comprising anonymizing the content consumption history associated with the user account prior to providing the first playlist and the second playlist.

Clause 13. The subject matter according to any preceding clause, wherein the plurality of machine learning algorithms are deployed at a server hosting and exposing the API.

Clause 14. The subject matter according to any preceding clause, wherein the plurality of machine learning algorithms are at least partially deployed at a computing device associated with the user account, and wherein the API is hosted at a server remote from the one or more media applications.

Clause 15. The subject matter according to any preceding clause, wherein the plurality of machine learning algorithms are each different machine learning models chosen from the group consisting of: collaborative filtering models, two-tower models, and sequence models.

Clause 16. The subject matter according to any preceding clause, wherein the plurality of machine learning algorithms are one or more of collaborative filtering models, two-tower models, or sequence models.

Clause 17. The subject matter according to any preceding clause, further comprising augmenting the provided first playlist and the provided second playlist periodically.

Clause 18. The subject matter according to any preceding clause, further comprising, prior to generating the first playlist and the second playlist, caching the first set of media content recommendations, the second set of media content recommendations, and the third set of media content recommendations.

Clause 19. The subject matter according to any preceding clause, further comprising, prior to generating the first playlist and the second playlist, obfuscating at least a subset of the first set of media content recommendations, the second set of media content recommendations, and/or the third set of media content recommendations based on user preferences.

Clause 20. A system comprising: one or more processors; and one or more memories having computer-readable instructions stored thereon, which when executed by one or more processors of the system, cause the system to: generate, by a plurality of machine learning algorithms, a first set of media content recommendations, a second set of media content recommendations, and a third set of media content recommendations, wherein first set of media content recommendations, the second set of media content recommendations, and the third set of media content recommendations are based on a content consumption history associated with a user account, and wherein the first set of media content recommendations, the second set of media content recommendations, and the third set of media content recommendations include at least one different media content recommendation from one another; expose an application programming interface (API) to one or more media applications; generate, via the API and in response to a user input associated with the one or more media applications, a first playlist based on the first set of media content recommendations and the second set of media content recommendations; generate, by the API and in response to an identifier of a computing device associated with the user account, a second playlist based on the second set of media content recommendations and the third set of media content recommendations; and provide, by the API, the first playlist and the second playlist to at least one of the one or more media applications.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully or partially automated via, software code modules executed by one or more general purpose computers or processors. The code modules may be stored in any type of computer-readable storage medium or other computer storage device. Some or all of the methods may additionally or alternatively be embodied in specialized computer hardware.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
generating, by a first machine learning algorithm, a first set of media content recommendations, the first set of media content recommendations being based on a content consumption history associated with a user account;
generating, by a second machine learning algorithm, a second set of media content recommendations based on the content consumption history associated with the user account, the second set of media content recommendations having different recommendations than the first set of media content recommendations;
generating, by a third machine learning algorithm, a third set of media content recommendations based on the content consumption history associated with the user account, the third set of media content recommendations having different recommendations than the first set of media content recommendations and the second set of media content recommendations;
exposing an application programming interface (API) to one or more media applications;
generating, via the API and in response to a user input through at least one of the one or more media applications, a first playlist based on a first subset of media content recommendations from the first set of media content recommendations and a second subset of media content recommendations from the second set of media content recommendations;
generating, by the API and in response to an identifier of a computing device associated with the user account, a second playlist based on the second subset of media content recommendations and a third subset of media content recommendations from the third set of media content recommendations; and
providing, by the API, the first playlist and the second playlist to the computing device associated with the user account.

2. The computer-implemented method of claim 1, further comprising anonymizing the content consumption history associated with the user account prior to providing the first playlist and the second playlist.

3. The computer-implemented method of claim 1, wherein the first machine learning algorithm, the second machine learning algorithm, and the third machine learning algorithm are deployed at a server hosting and exposing the API.

4. The computer-implemented method of claim 1, wherein the first machine learning algorithm, the second machine learning algorithm, and the third machine learning algorithm are at least partially deployed at the computing device, and wherein the API is hosted at a server remote from the computing device.

5. The computer-implemented method of claim 1, wherein the first machine learning algorithm, the second machine learning algorithm, and the third machine learning algorithm are each different machine learning models chosen from the group consisting of collaborative filtering models, two-tower models, and sequence models.

6. The computer-implemented method of claim 1, wherein the first machine learning algorithm, the second machine learning algorithm, and the third machine learning algorithm are one or more of collaborative filtering models, two-tower models, or sequence models.

7. The computer-implemented method of claim 1, further comprising augmenting the provided first playlist and the provided second playlist periodically.

8. The computer-implemented method of claim 1, further comprising, prior to generating the first playlist and the second playlist, caching the first set of media content recommendations, the second set of media content recommendations, and the third set of media content recommendations.

9. The computer-implemented method of claim 1, further comprising, prior to generating the first playlist and the second playlist, obfuscating at least a subset of the first set of media content recommendations, the second set of media content recommendations, or the third set of media content recommendations based on user preferences.

10. The computer-implemented method of claim 1, wherein at least one of the first playlist and the second playlist are configured to transition between one musicality aspect of media content contained therein based upon user preferences.

11. A computer-implemented method, comprising:
generating, by a plurality of machine learning algorithms, a first set of media content recommendations, a second set of media content recommendations, and a third set of media content recommendations,
wherein first set of media content recommendations, the second set of media content recommendations, and the third set of media content recommendations are based on a content consumption history associated with a user account, and wherein the first set of media content recommendations, the second set of media content recommendations, and the third set of media content recommendations include at least one different media content recommendation from one another;

exposing an application programming interface (API) to one or more media applications;

generating, via the API and in response to a user input associated with the one or more media applications, a first playlist based on the first set of media content recommendations and the second set of media content recommendations;

generating, by the API and in response to an identifier of a computing device associated with the user account, a second playlist based on the second set of media content recommendations and the third set of media content recommendations; and providing, by the API, the first playlist and the second playlist to at least one of the one or more media applications.

12. The computer-implemented method of claim 11, further comprising anonymizing the content consumption history associated with the user account prior to providing the first playlist and the second playlist.

13. The computer-implemented method of claim 11, wherein the plurality of machine learning algorithms are deployed at a server hosting and exposing the API.

14. The computer-implemented method of claim 11, wherein the plurality of machine learning algorithms are at least partially deployed at a computing device associated with the user account, and wherein the API is hosted at a server remote from the one or more media applications.

15. The computer-implemented method of claim 11, wherein the plurality of machine learning algorithms are each different machine learning models chosen from the group consisting of collaborative filtering models, two-tower models, and sequence models.

16. The computer-implemented method of claim 11, wherein the plurality of machine learning algorithms are one or more of collaborative filtering models, two-tower models, or sequence models.

17. The computer-implemented method of claim 11, further comprising augmenting the provided first playlist and the provided second playlist periodically.

18. The computer-implemented method of claim 11, further comprising, prior to generating the first playlist and the second playlist, caching the first set of media content recommendations, the second set of media content recommendations, and the third set of media content recommendations.

19. The computer-implemented method of claim 11, further comprising, prior to generating the first playlist and the second playlist, obfuscating at least a subset of the first set of media content recommendations, the second set of media content recommendations, and/or the third set of media content recommendations based on user preferences.

20. A system comprising:

one or more processors; and one or more memories having computer-readable instructions stored thereon, which when executed by one or more processors of the system, cause the system to:

generate, by a plurality of machine learning algorithms, a first set of media content recommendations, a second set of media content recommendations, and a third set of media content recommendations, wherein first set of media content recommendations, the second set of media content recommendations, and the third set of media content recommendations are based on a content consumption history associated with a user account, and wherein the first set of media content recommendations, the second set of media content recommendations, and the third set of media content recommendations include at least one different media content recommendation from one another;

expose an application programming interface (API) to one or more media applications;

generate, via the API and in response to a user input associated with the one or more media applications, a first playlist based on the first set of media content recommendations and the second set of media content recommendations;

generate, by the API and in response to an identifier of a computing device associated with the user account, a second playlist based on the second set of media content recommendations and the third set of media content recommendations; and provide, by the API, the first playlist and the second playlist to at least one of the one or more media applications.

* * * * *